United States Patent
Chae

(10) Patent No.: US 10,904,864 B2
(45) Date of Patent: Jan. 26, 2021

(54) METHOD AND DEVICE FOR TRANSMITTING AND RECEIVING PSCCH AND PSSCH BY TERMINAL IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/327,796

(22) PCT Filed: Aug. 23, 2017

(86) PCT No.: PCT/KR2017/009201
§ 371 (c)(1),
(2) Date: Feb. 22, 2019

(87) PCT Pub. No.: WO2018/038525
PCT Pub. Date: Mar. 1, 2018

(65) Prior Publication Data
US 2019/0239203 A1 Aug. 1, 2019

Related U.S. Application Data

(60) Provisional application No. 62/379,234, filed on Aug. 24, 2016.

(51) Int. Cl.
*H04W 72/04* (2009.01)
*H04L 5/00* (2006.01)
(Continued)

(52) U.S. Cl.
CPC ...... *H04W 72/0406* (2013.01); *H04B 17/327* (2015.01); *H04L 1/18* (2013.01);
(Continued)

(58) Field of Classification Search
CPC . H04W 72/0406; H04W 24/10; H04W 92/18; H04B 17/327; H04L 1/18; H04L 1/1829; H04L 5/00
(Continued)

(56) References Cited

U.S. PATENT DOCUMENTS

| 2016/0073408 A1* | 3/2016 | Sartori | H04W 76/14 370/329 |
| 2017/0215183 A1* | 7/2017 | Gulati | H04L 1/1812 |
| 2018/0206260 A1* | 7/2018 | Khoryaev | H04W 72/02 |

FOREIGN PATENT DOCUMENTS

| JP | 2011250407 | 12/2011 |
| WO | 2015172395 | 11/2015 |
| WO | 2016021227 | 2/2016 |

OTHER PUBLICATIONS

PCT International Application No. PCT/KR2017/009201, Written Opinion of the International Searching Authority dated Nov. 23, 2017, 20 pages.
(Continued)

*Primary Examiner* — Obaidul Huq
(74) *Attorney, Agent, or Firm* — Lee, Hong, Degerman, Kang & Waimey PC

(57) ABSTRACT

An embodiment of the present invention provides a method for receiving a physical sidelink control channel (PSCCH) and a physical sidelink shared channel (PSSCH) by a terminal in a wireless communication system. The method for receiving a PSCCH and a PSSCH comprises the steps of: receiving a PSCCH comprising information, which indicates a time interval between a PSCCH and a PSSCH indicated by means of the PSCCH, and information which indicates whether the PSSCH is retransmission; and receiving the PSSCH in a resource determined by means of the information indicating the time interval and the information indicating whether the PSSCH is retransmission, wherein, on the
(Continued)

basis of whether the PSSCH is retransmission, the information indicating the time interval is determined to be used as a positive value or a negative value when the resource is determined.

12 Claims, 27 Drawing Sheets

(51) Int. Cl.
*H04L 1/18* (2006.01)
*H04B 17/327* (2015.01)
*H04W 24/10* (2009.01)
*H04W 92/18* (2009.01)

(52) U.S. Cl.
CPC .............. *H04L 1/1829* (2013.01); *H04L 5/00* (2013.01); *H04W 24/10* (2013.01); *H04W 92/18* (2013.01)

(58) Field of Classification Search
USPC ................................ 370/310, 328, 329, 330
See application file for complete search history.

(56) References Cited

OTHER PUBLICATIONS

Intel, "On PSCCH and PSSCH transmission and combining options", 3GPP TSG RAN WG1 Meeting #86, R1-167695, Aug. 2016, 5 pages.

Intel, "Scheduling assignment for sidelink V2V communication", 3GPP TSG RAN WG1 Meeting #86, R1-166516, Aug. 2016, 10 pages.

Intel, "Details of resource pool design for sidelink V2V communication", 3GPP TSG RAN WG1 Meeting #86, R1-166515, Aug. 2016, 8 pages.

Ericsson, "MAC impacts of asynchronous HARQ for BL UEs and UEs in EC", 3GPP TSG RAN WG2 Meeting #93, R2-161689, Feb. 2016, 10 pages.

European Patent Office Application Serial No. 17843945.1, Search Report dated Mar. 17, 2020, 8 pages.

Lenovo, "SA contents for V2V", R1-162735, 3GPP TSG RAN WG1 Meeting #84bis, Apr. 2016, 3 pages.

* cited by examiner

FIG. 5
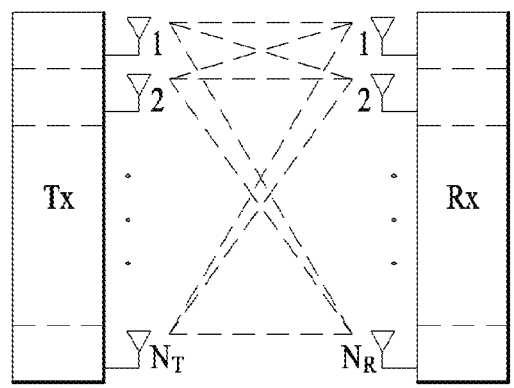
(a)
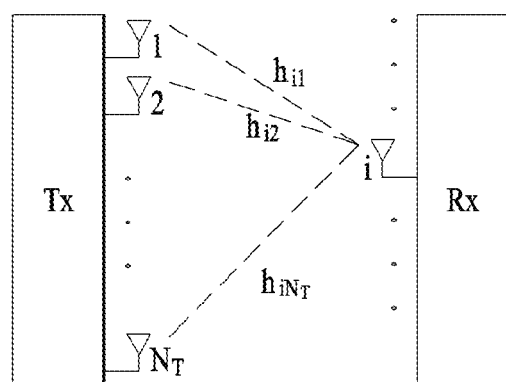
(b)

FIG. 8
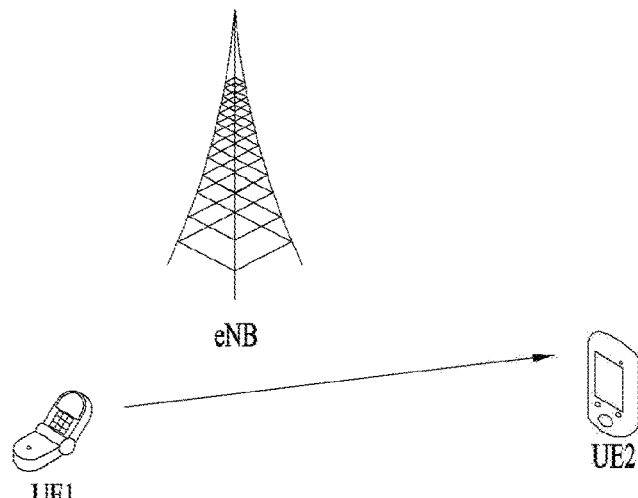
(a)
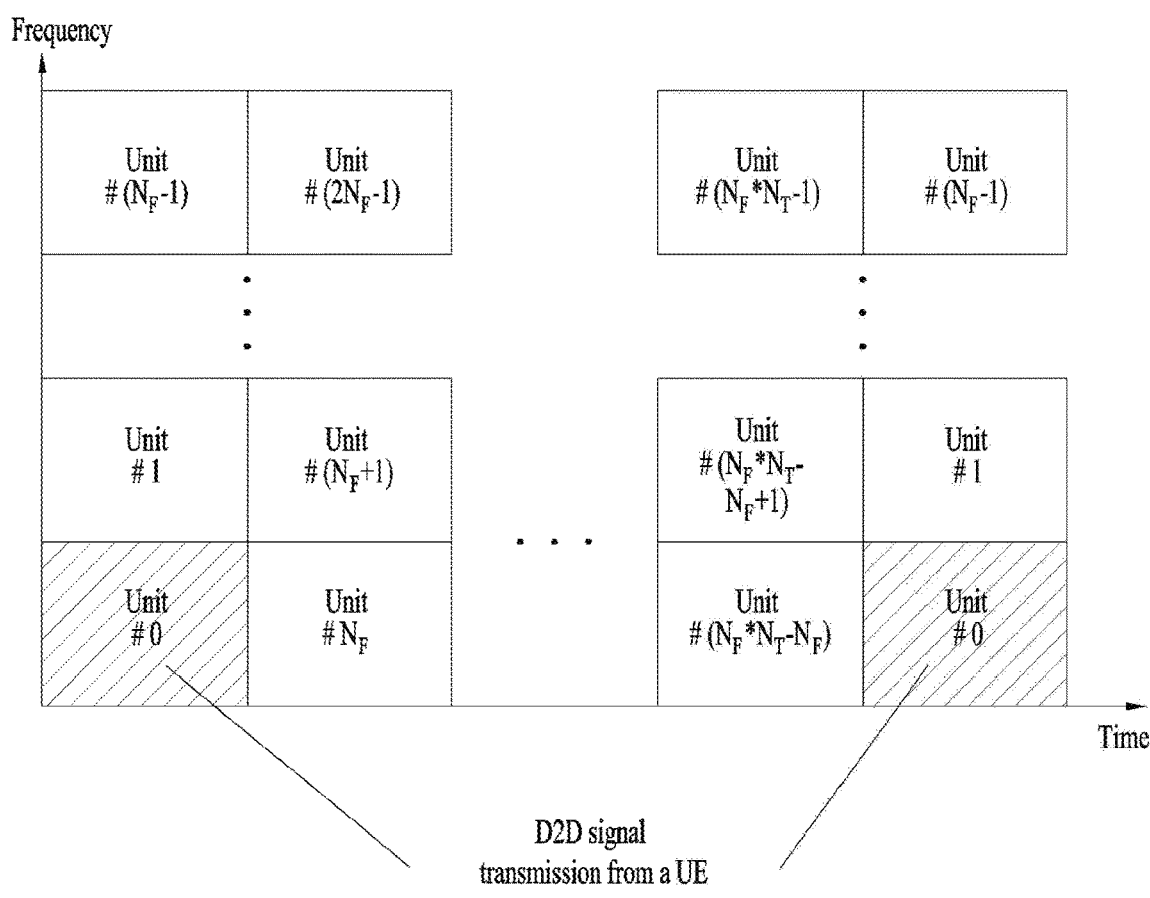
(b)

FIG. 13
(a)
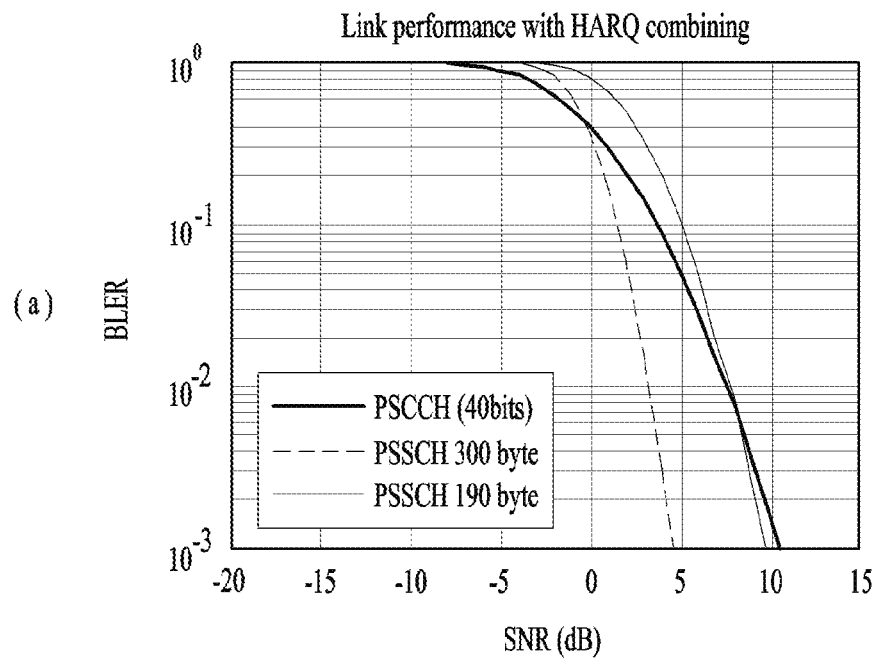
(b)
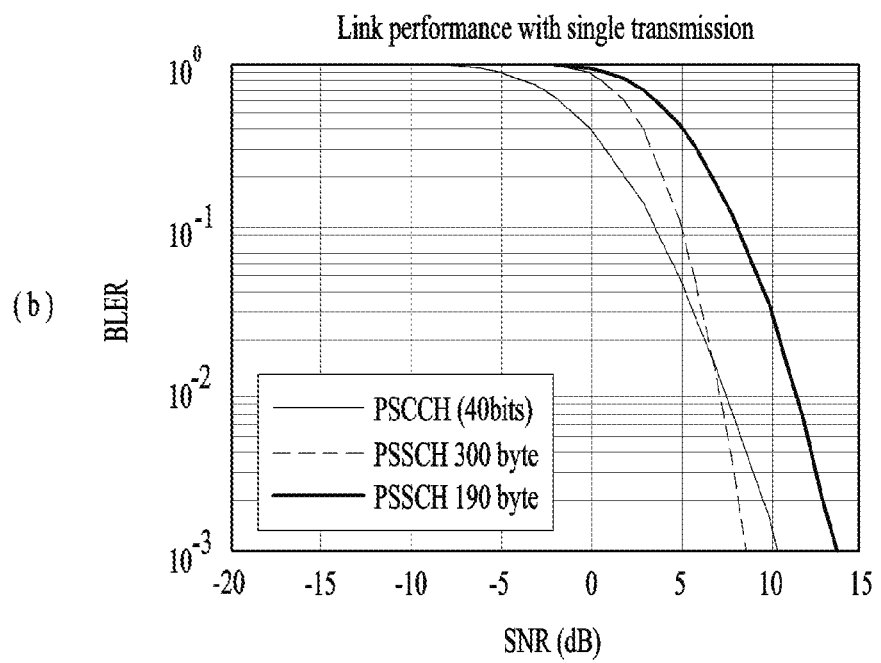

FIG. 17
(a) 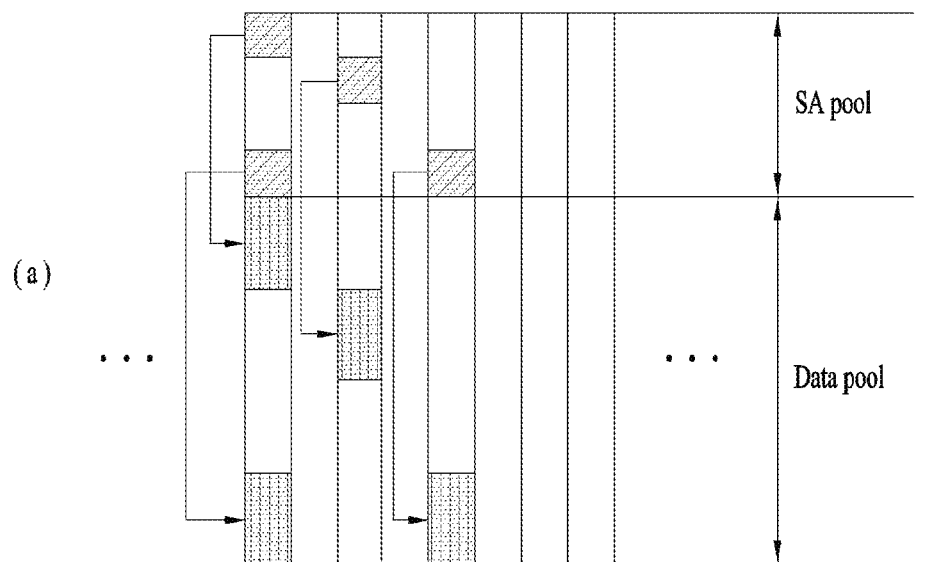
(b) 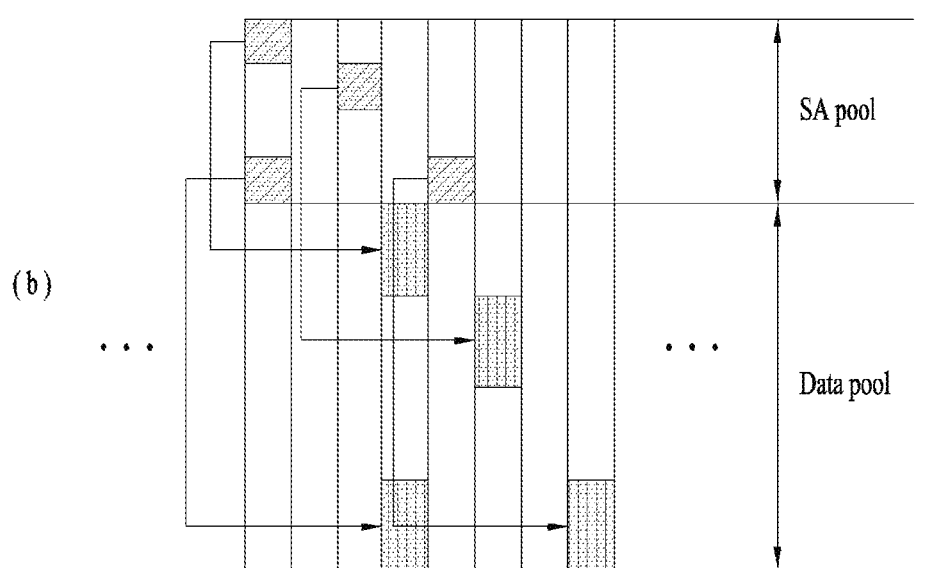

FIG. 19
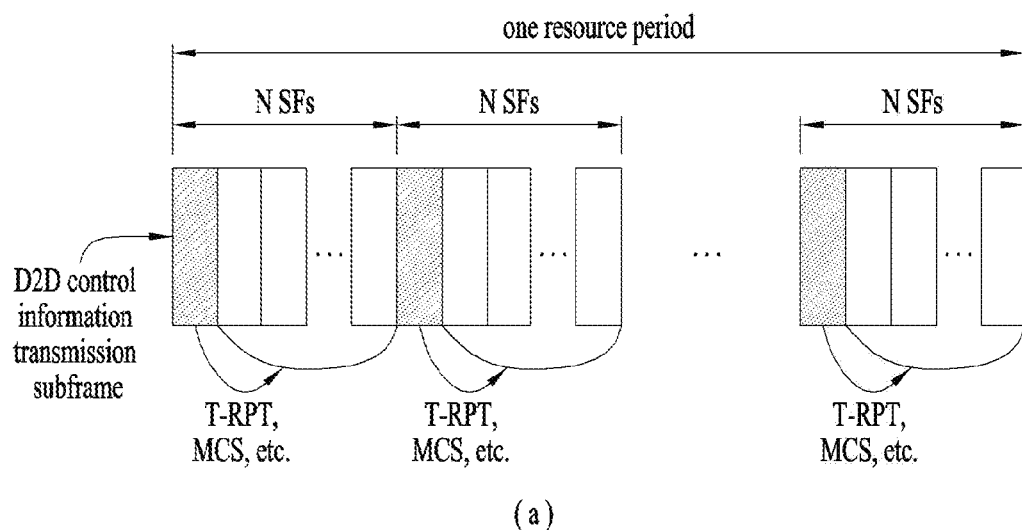
(a)
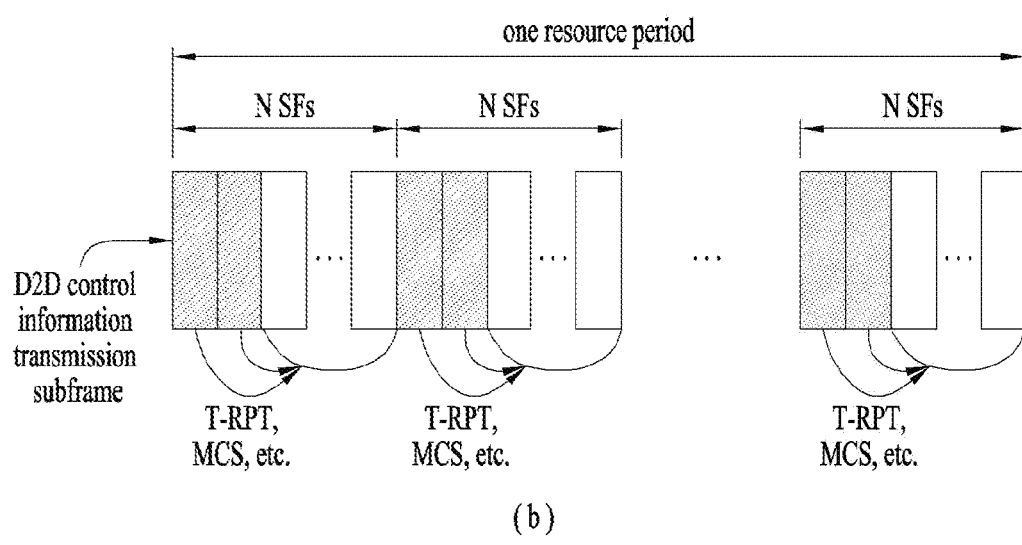
(b)

FIG. 20
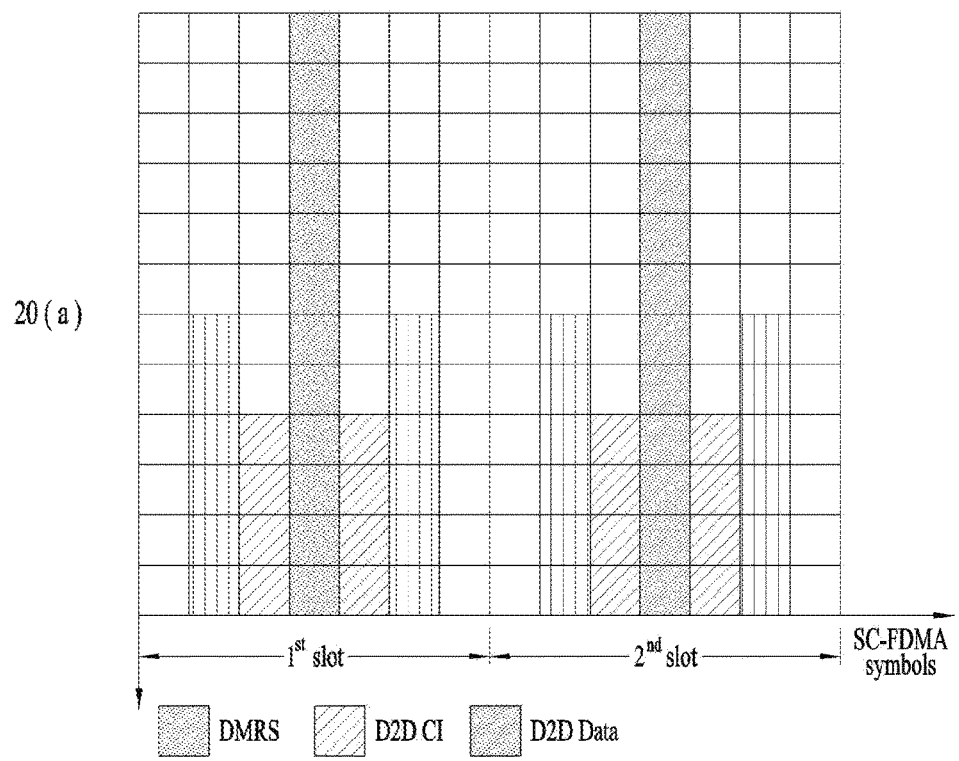
20(a)
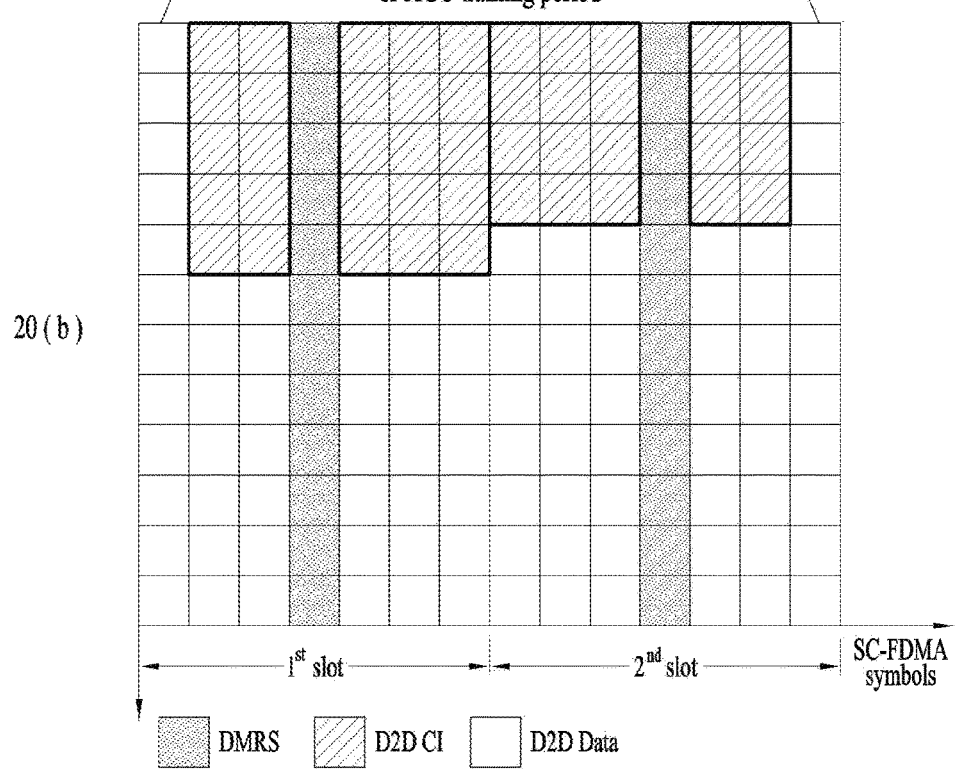
20(b)

FIG. 21
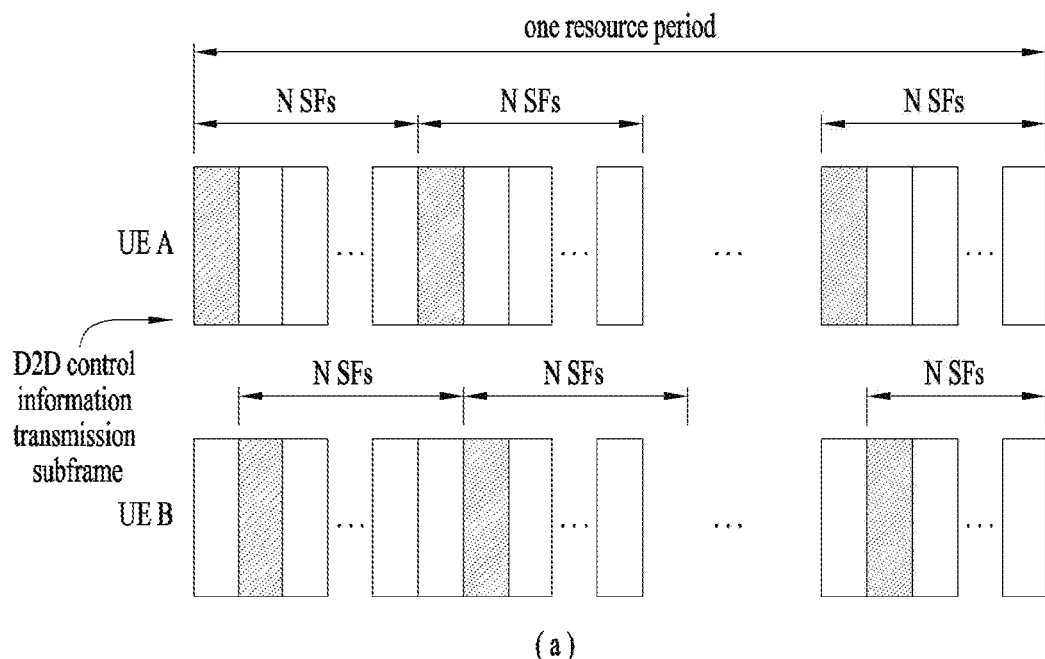
(a)
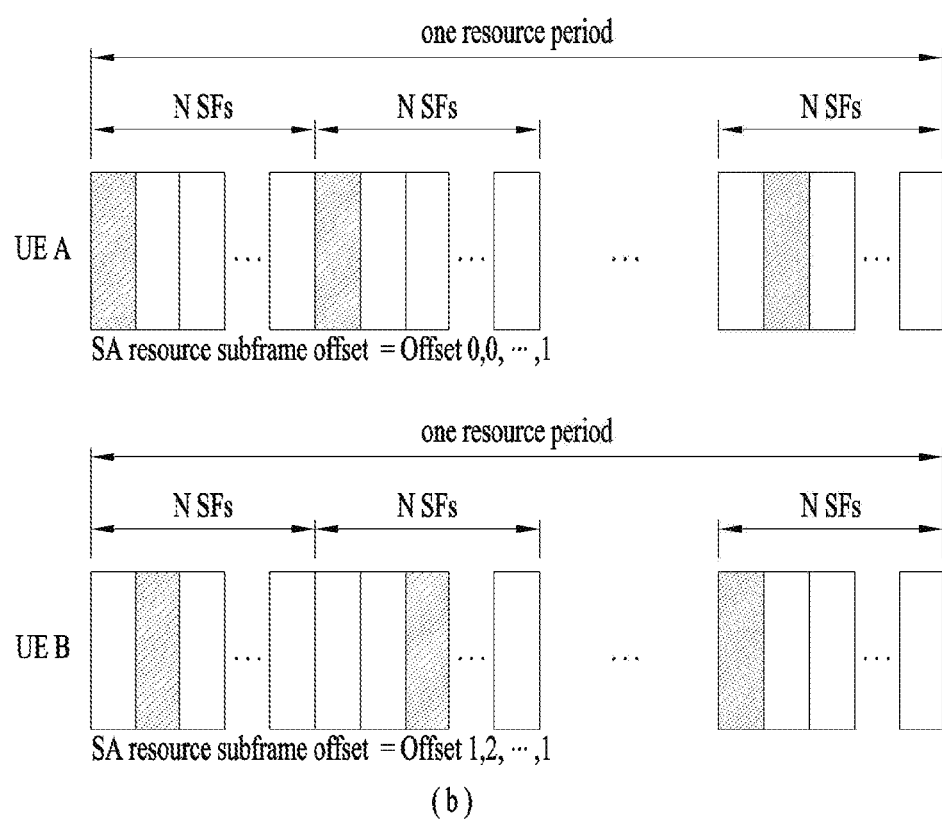
(b)

FIG. 23
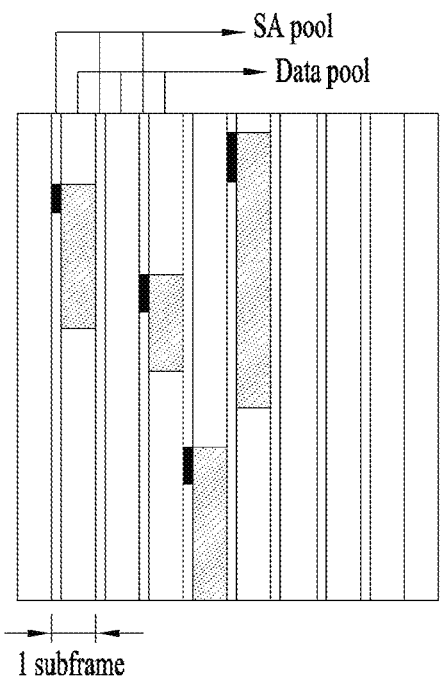
(a)
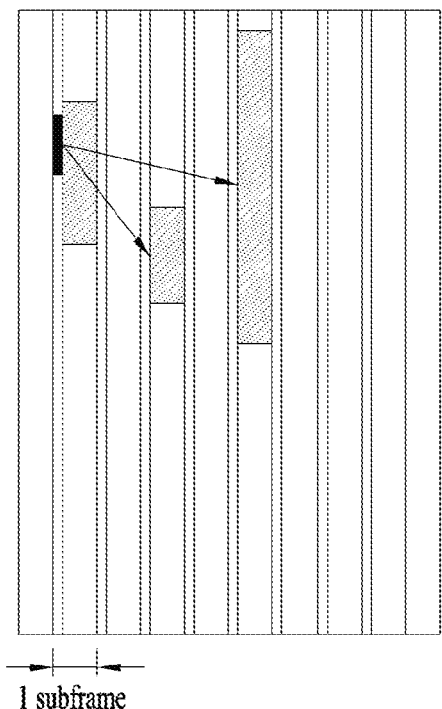 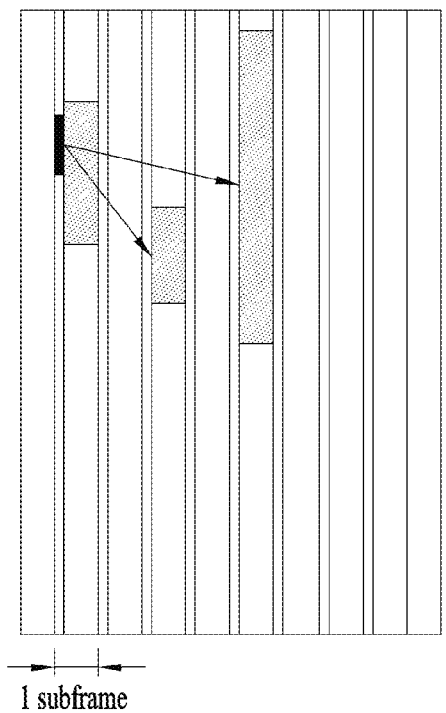
(b) (c)

FIG. 25
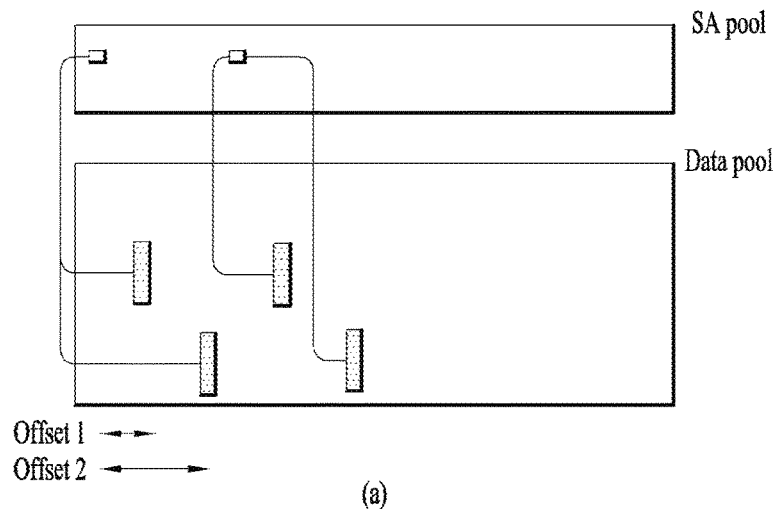
(a)
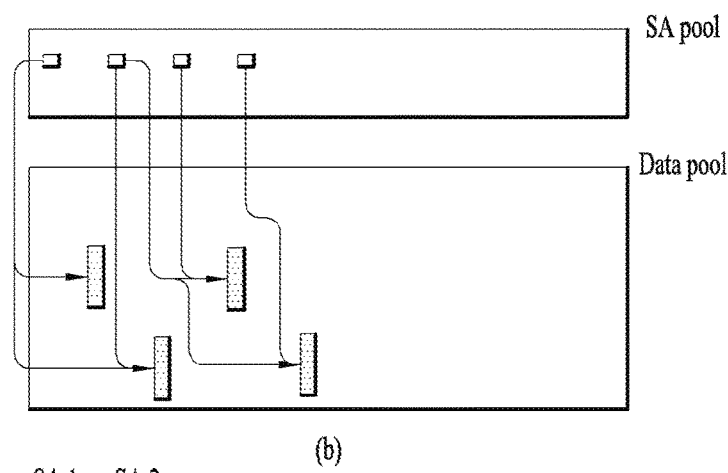
(b)
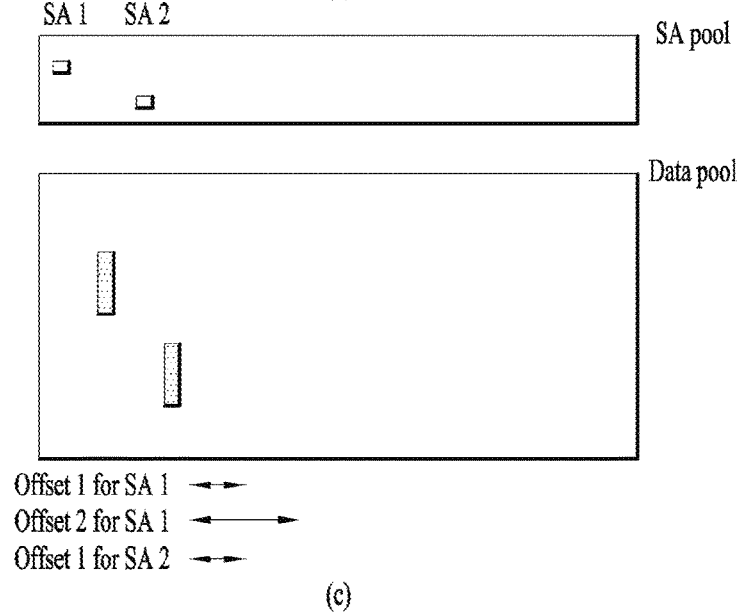
(c)

METHOD AND DEVICE FOR TRANSMITTING AND RECEIVING PSCCH AND PSSCH BY TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2017/009201, filed on Aug. 23, 2017, which claims the benefit of U.S. Provisional Application No. 62/379,234, filed on Aug. 24, 2016, the contents of which are all hereby incorporated by reference herein in their entirety.

TECHNICAL FIELD

Following description relates to a wireless communication system, and more particularly, to a method for a user equipment (UE) to transmit and receive a PSCCH (physical sidelink control channel) and a PSSCH (physical sidelink shared channel) and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Task

A technical task of the present invention is to provide a method of identifying a PSSCH by differently interpreting time interval information according to whether a PSSCH transmission corresponds to a first transmission or a retransmission.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve these and other advantages and in accordance with the purpose of the present invention, as embodied and broadly described, according to one embodiment, a method of receiving a PSCCH (Physical sidelink control channel) and a PSSCH (Physical sidelink shared channel), which are received by a user equipment (UE) in a wireless communication system, includes the steps of receiving a PSCCH including information indicating a time interval between the PSCCH and a PSSCH indicated by the PSCCH and information indicating whether the PSSCH corresponds to a retransmission and receiving the PSSCH in a resource which is determined using the information indicating the time interval and the information indicating whether the PSSCH corresponds to the retransmission. In this case, when the resource is determined, the information indicating the time interval can be used as a positive value or a negative value depending on whether the PSSCH corresponds to the retransmission.

To further achieve these and other advantages and in accordance with the purpose of the present invention, according to a different embodiment, a user equipment (UE) receiving a PSCCH (Physical sidelink control channel) and a PSSCH (Physical sidelink shared channel) in a wireless communication system includes a transmitter and receiver and a processor, the processor configured to receive a PSCCH including information indicating a time interval between the PSCCH and a PSSCH indicated by the PSCCH and information indicating whether the PSSCH corresponds to a retransmission via the receiver, the processor configured to receive the PSSCH in a resource which is determined using the information indicating the time interval and the information indicating whether the PSSCH corresponds to the retransmission via the receiver. In this case, when the resource is determined, the information indicating the time interval can be used as a positive value or a negative value depending on whether the PSSCH corresponds to the retransmission.

When the PSSCH corresponds to the retransmission, the resource can be located at a subframe prior to a subframe in which the PSCCH is received as much as the information indicating the time interval.

When the PSSCH corresponds to a first transmission of the retransmission, the resource can be located at a subframe appearing after a subframe in which the PSCCH is received as much as the information indicating the time interval.

When the PSCCH and the PSSCH are FDMed (Frequency Division Multiplexed) and the PSSCH corresponds to the retransmission, the UE can estimate a measurement result for the PSSCH using a measurement result of a first transmission of the retransmission.

The measurement result may correspond to transmit power of a reference signal for the PSSCH.

The reference signal may correspond to a DMRS (De-Modulation Reference Signal) of the PSCCH.

Advantageous Effects

According to the present invention, although a UE misses a PSCCH, the UE can identify a firstly transmitted PSSCH and a retransmitted PSSCH. In particular, it is able to reliably forward a PSCCH without using MCS of a higher level or relatively higher transmit power.

It will be appreciated by persons skilled in the art that the objects that could be achieved with the present invention are not limited to what has been particularly described hereinabove and other objects that the present invention could achieve will be more clearly understood from the following detailed description.

DESCRIPTION OF DRAWINGS

The accompanying drawings, which are included to provide a further understanding of the present invention and are incorporated in and constitute a part of this application, illustrate embodiments of the present invention and together with the description serve to explain the principle of the disclosure. In the drawings

FIG. 5 is a view illustrating the configuration of a wireless communication system having multiple antennas;

FIG. 8 is a view illustrating an exemplary D2D resource pool for D2D communication;

FIGS. 10 to 18 are diagrams illustrating various methods of distinguishing SA transmission from D2D data transmission on a frequency axis;

FIGS. 19 to 23 are diagrams illustrating various methods of distinguishing SA transmission from D2D data transmission on a time axis;

FIGS. 25 to 26 are diagrams illustrating a case that SA indicates two D2D data;

BEST MODE

Mode for Invention

Figure 1:
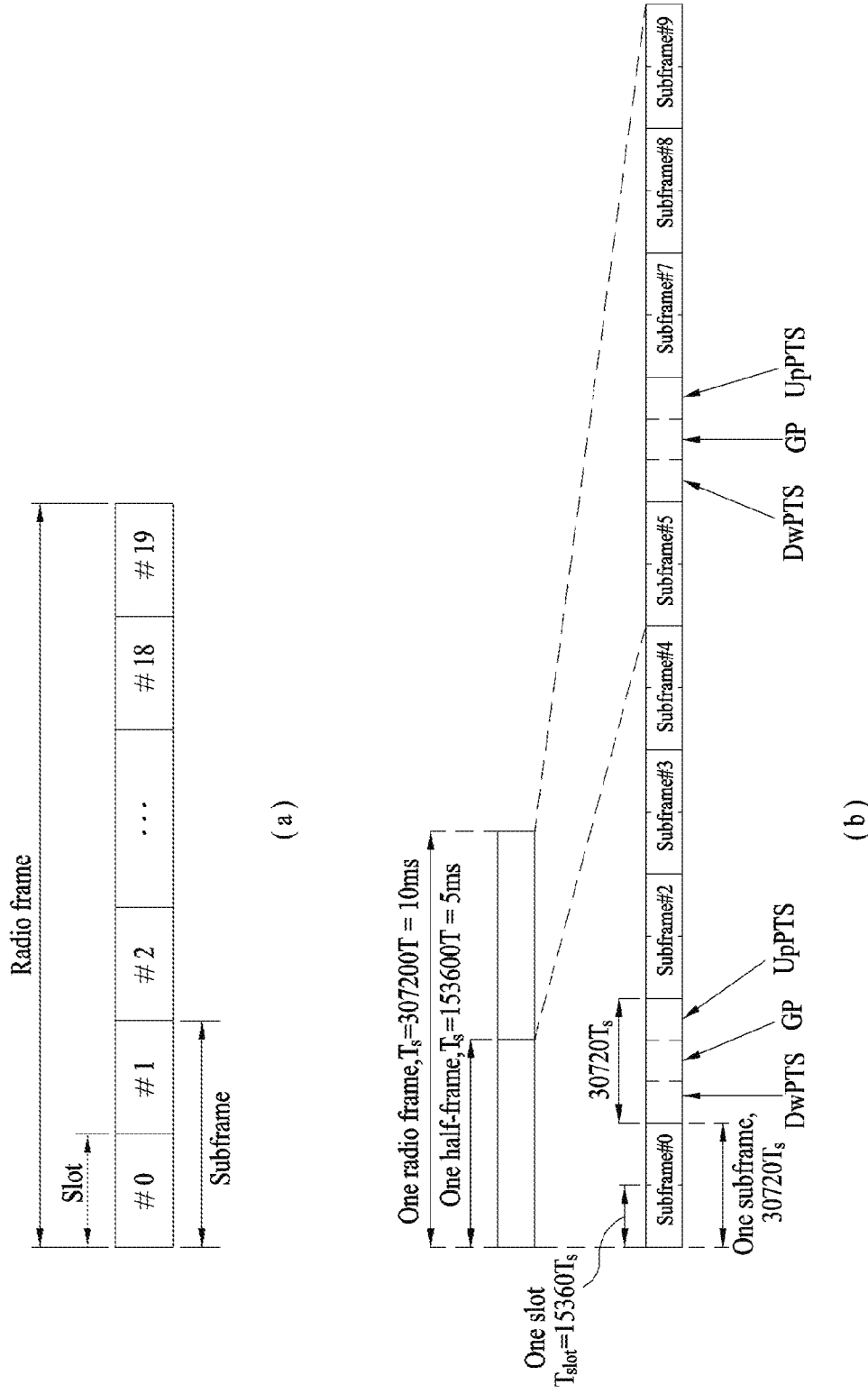
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS).

3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
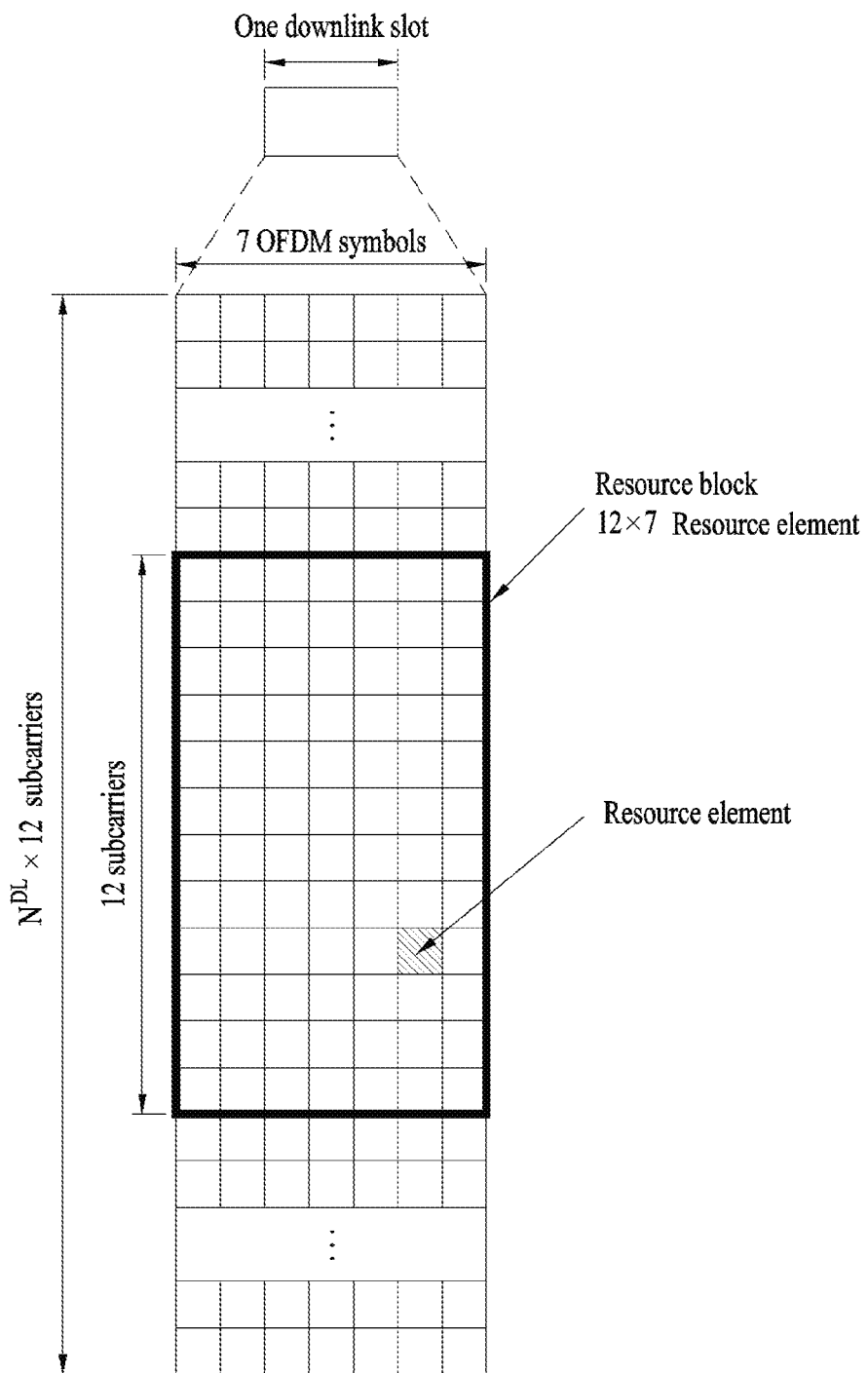
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
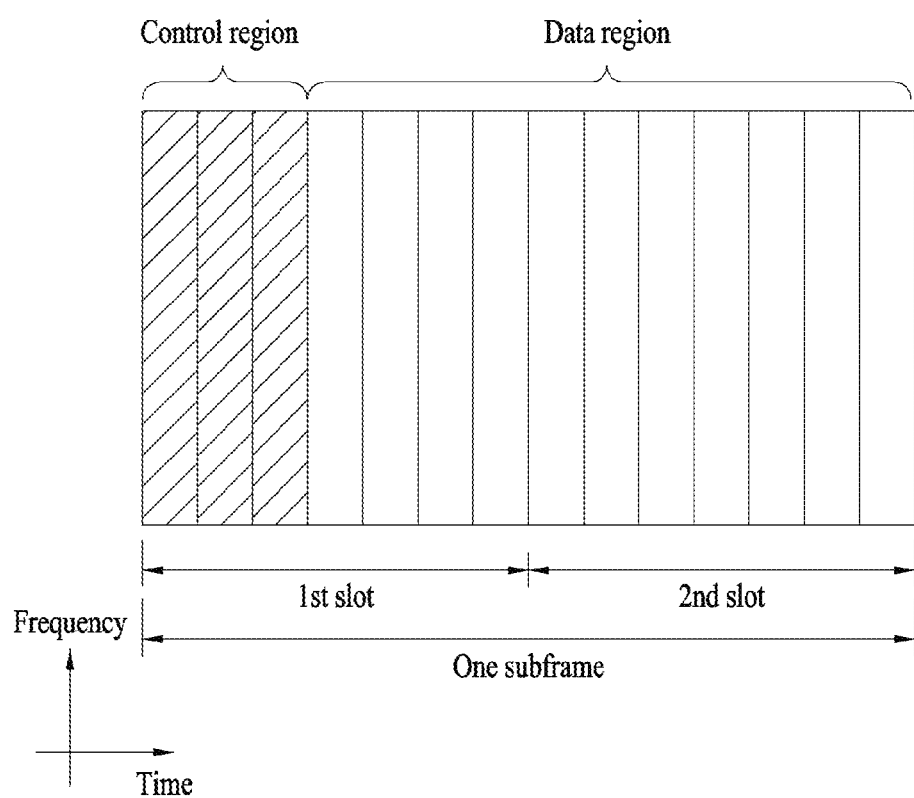
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
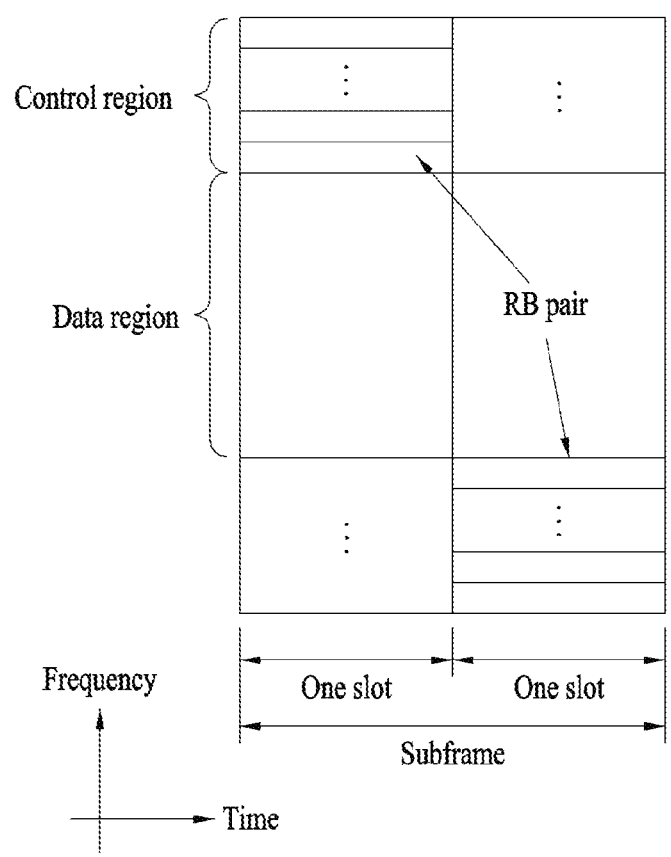
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$

[Equation 5]

$$W\hat{s} = WPs$$

In Equation 5, $w_{ij}$ denotes a weight between an $i^{th}$ Tx antenna and $j^{th}$ information. w is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$

[Equation 8]

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
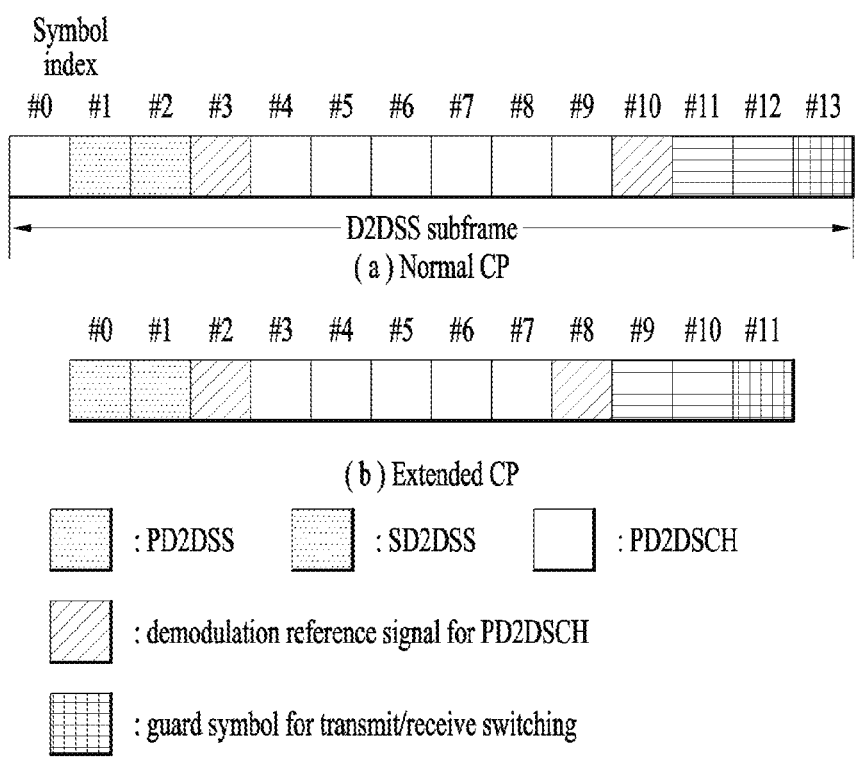
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
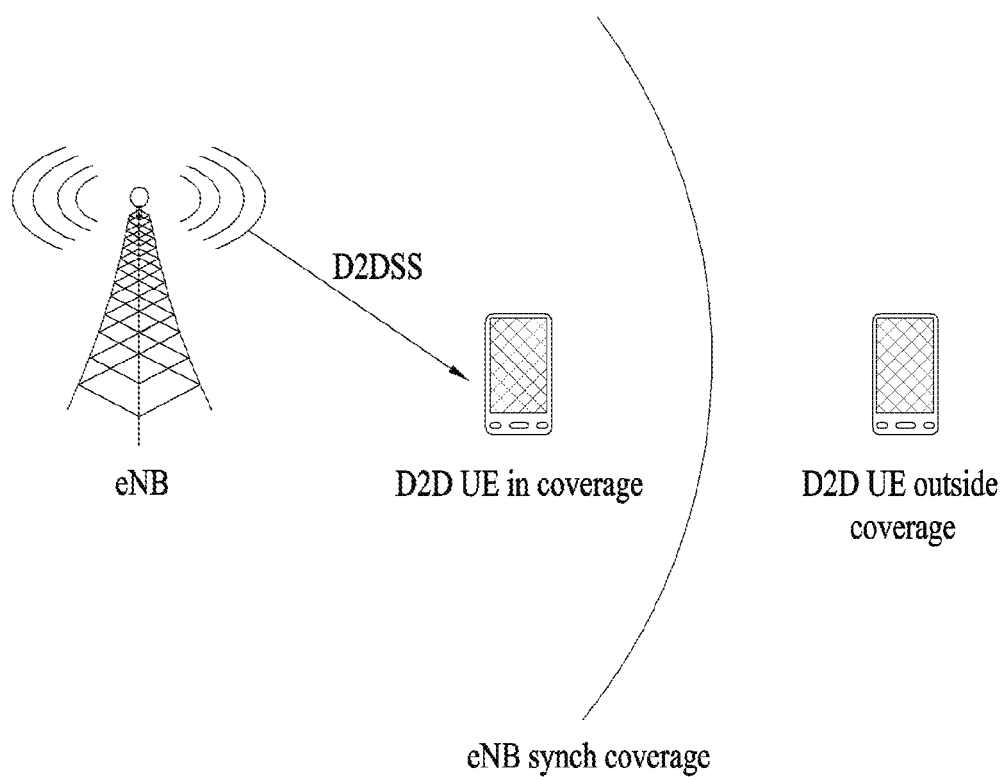
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
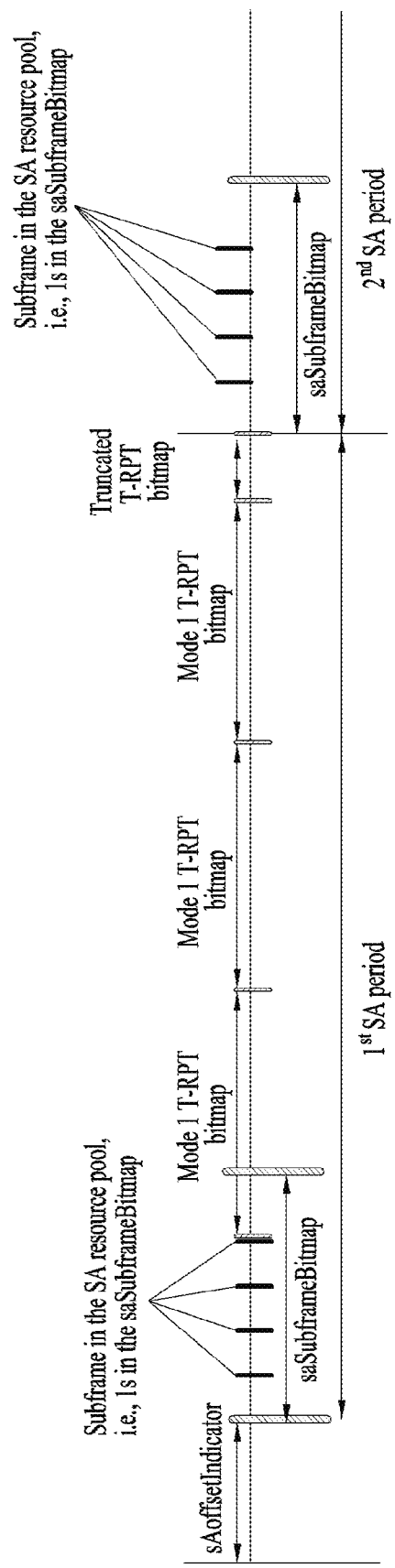
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1s set in a T-RPT bitmap in an indicated T-RPT, and transmits one medium access control layer protocol data unit (MAC PDU) four times.

In the following, methods for a transmission device to dynamically indicate a position of a resource transmitting a signal in a device-to-device (D2D) communication, a vehicle-to-vehicle (V2V) communication, or a vehicle-to-something communication based on the aforementioned description are explained. And, when SA and data are TDMed, a method of performing measurement, a method of using an offset, and the like are explained. In case of performing such a service as V2X and V2V, it may more tightly apply a delay constraint compared to a cellular communication or D2D communication and it may be necessary to change transmission-related parameters such as a transmission resource, resource allocation, MCS, etc. In this situation, it is difficult to apply a legacy SA transmission and a data transmission scheme based on T-RPT as it is. For example, when SA and data are transmitted according to a legacy scheme, if it fails to receive the SA, it may fail to receive a data packet. And, although a packet is generated in the middle of an SA period, it is unable to immediately transmit a data packet, thereby increasing delay. In the following, methods of more dynamically transmitting a D2D control signal (SA) and a D2D data are explained. In the following description, SA (scheduling assignment) or D2D control information corresponds to a common name of a signal that transmits various control information necessary for transmitting D2D data information. The SA (scheduling assignment) or the D2D control information includes all or a part of a subframe pattern (e.g., T-RPT), frequency resource allocation, MCS, transmit power, RV (redundancy version), RV cycling type (information indicating whether RV is fixed or modifiable), transmission count per MAC PDU, and NDI. Each SA transmission may transmit different control information. In the following description, a method of distinguishing a transmission of SA from a transmission of D2D data on a frequency axis is explained first and then a method of distinguishing transmissions from each other on a time axis is explained. The distinction is performed for clarity. It does not mean that one method completely excludes another method. In particular, when a transmission of SA is distinguished from a transmission of D2D data on a frequency axis, the SA and the D2D data can be TDMed.

Figure 10:
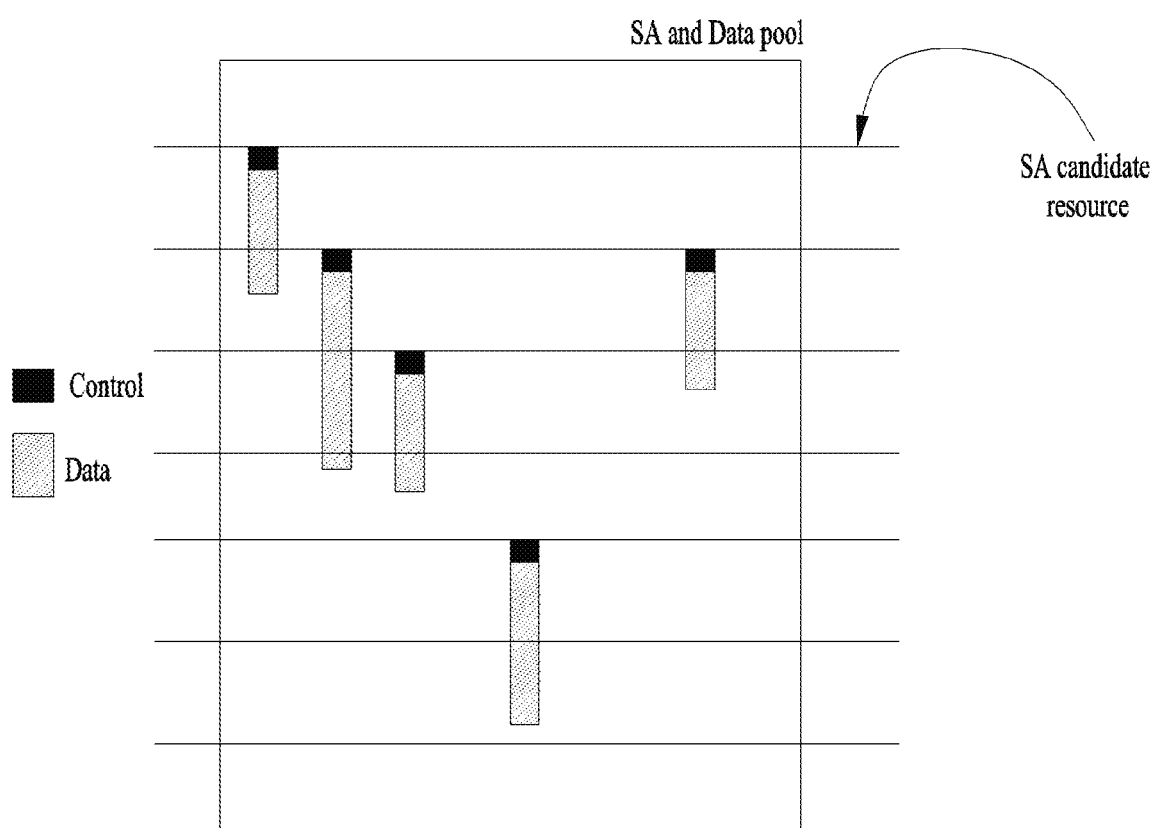
Figure 11:
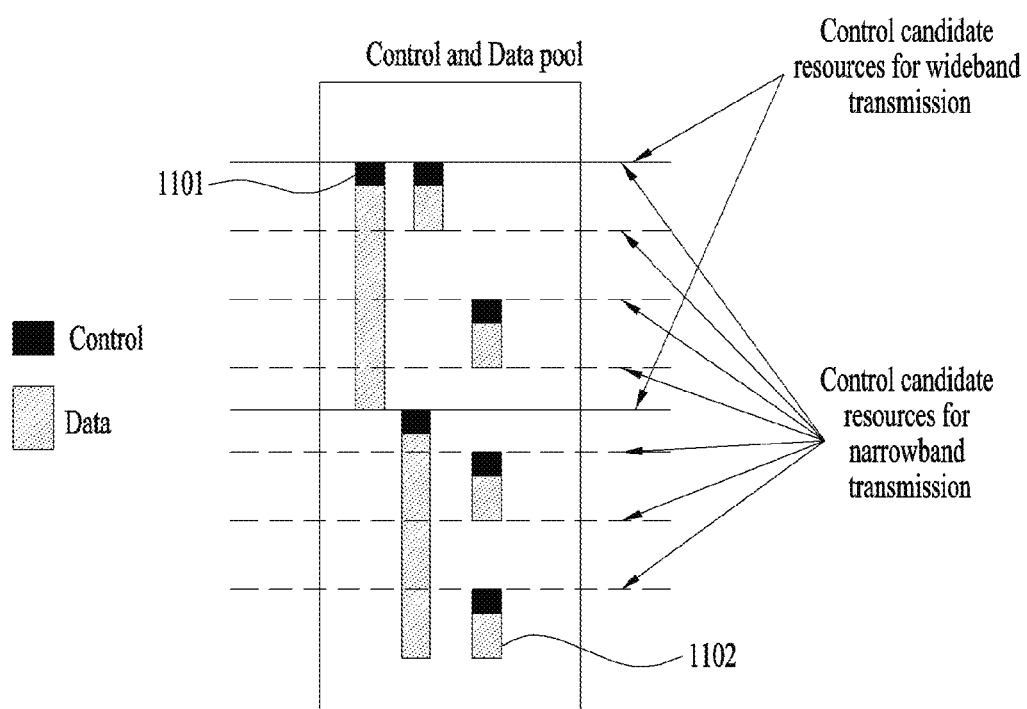
Figure 12:
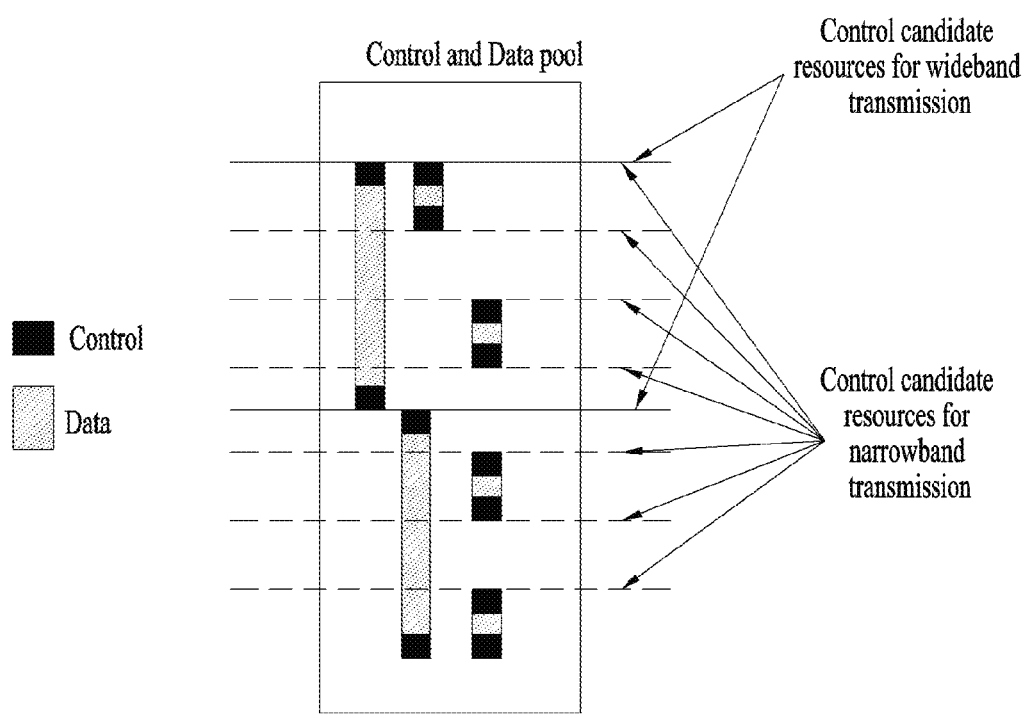

Method of Distinguishing SA Transmission from D2D Data Transmission on Frequency Axis It may distinctively transmit control information in frequency domain and data can be transmitted after (or prior to) the control information in a manner of being concatenated with the control information. A UE transmits D2D control information and can transmit D2D data corresponding to the D2D control information. In this case, the D2D control information and the D2D data are transmitted in the same subframe and the D2D control information and the D2D data are always adjacent to each other on a frequency axis. In this case, when the D2D control information and the D2D data are adjacent to each other, it may mean that the D2D control information and the D2D data are continuous on the frequency axis. Examples of continuously transmitting the D2D control information and the D2D data are illustrated in FIGS. 10 to 12. Detail contents on FIGS. 10 to 12 shall be explained later.

When SA and data are transmitted in the same subframe in a manner of being FDMed, it may apply an offset to power of the SA and power of the data. A power offset value of the SA and a power offset value of the data can be differently configured depending on whether the SA and the data are TDMed or FDMed. Or, when the SA and the data are TDMed, it may not apply a separate offset (offset value=0).

In particular, it may apply a power offset value to the D2D control information and the D2D data, respectively. And, a different power offset value can be applied to the D2D control information and the D2D data, respectively. If the same power offset or the same PSD (power spectral density) is applied to the D2D control information and the D2D data, a problem such that coverage of the D2D control information becomes smaller than coverage of the data may occur. For example, referring to FIG. 13 (b), it is able to check that SNR of PSCCH is lower than SNR of PSSCH in the same BLER. Hence, the problem can be resolved by applying a different power offset to the D2D control information and the D2D data. Specifically, if the coverage of the D2D control information is widened by transmitting the D2D control information with power increased as much as a power offset, it is able to solve a mismatch problem between the coverage of the D2D control information and the coverage of the D2D data.

Moreover, a power offset value may change according to a size of a resource allocated to the D2D control information and a size of a resource allocated to the D2D data. For example, when a size of a resource allocated to the data is big, an offset value can be configured to be big. In particular, when the size allocated to the data increases, it may be able to obtain an effect of expanding the coverage of the data with the help of more coding gains. In this case, it may be able to assign higher transmit power to a control signal. However, when the size allocated to the data exceeds a specific threshold, it may fail to satisfy a minimum PSD level required by an Rx UE. In particular, if the size allocated to the data is simply configured by a proportional relationship, a problem may occur. Hence, it is unable to make a decision on a size of a data resource and a size of a transmit power offset by a proportional relationship or an inverse proportional relationship. It is able to determine an offset size to make BLER performance of a control signal have higher SNR in a required BLER level by anticipating link performance according to a size of a resource allocated to the data and comparing BLER performance of data with BLER performance of data. Referring to FIG. 13, it is able to check that BLER varies depending on a message size (and/or a retransmission count). (A graph described in FIG. 13 illustrates BLER performance for 190-byte SA (10 RBs), 300-byte SA (10 RBs), and 40-bit SA (1RB). HARQ combining assumes combining of 2 transmissions and single transmission corresponds to BLER for single transmission.) In particular, when a message of 190 bytes and a message of 300 bytes are transmitted, a power offset value for SA and a power offset value for data can be differently configured.

The power offset can be indicated by a network or can be determined by a UE. In general, a signal can be smoothly transmitted and received when an error rate of a control channel is lower than an error rate of a data channel. The error rates of the control channel and the data channel can be determined based on an RB size of the data channel, a message size, MCS, moving speed of a UE, a retransmission number, target QoS, and the like.

Meanwhile, although the power offset is indicated in a form of an offset between a data signal and a control signal, the power offset can also by signaled in a form of a ratio of power to be allocated to a control signal (or a data signal). For example, the power offset can be signaled in a form indicating that X % of the total transmit power is assigned to a control signal.

Meanwhile, when a size of power offset is determined according to a size of a resource allocated to data, it may indicate that power is assigned according to an RB or power is assigned to each of a control signal channel and a data signal channel. The former case is applied when power allocation means a size of power allocated according to an RB. The latter case is applied when power allocation means a size of power allocated according to a signal type.

When power is assigned to a data signal, the remaining power except power applied to a control signal can be used for the data signal. In this case, a size of a power offset may change according to a size of a resource allocated to the data signal. For example, assume that there is power as much as 100. In this case, assume that power of 30 is assigned to a control signal and power of 70 is assigned to a data signal. If a size of the data signal corresponds to 1 RB, the power of 70 is assigned to 1 RB of the data signal. If the size of the data signal corresponds to 7 RBs, power of 10 is assigned to each of the 7 RBs. In particular, a size of an offset can be naturally changed according to a size of a data resource in the aspect of power offset (of a control signal and a data signal) per RB.

When a network assigns a data channel to a UE, the network can signal a power offset value interlocked with a resource allocation size (RB size) to the UE. The power offset value can be transmitted in a manner of being included in D2D control information. In particular, power offset values of SA and data can be transmitted in a manner of being included in the SA to make an Rx UE refer to the power offset values in decoding a measured data.

Or, the UE may determine a power offset value. In this case, the UE can determine the power offset value according to moving speed of the UE. Or, when the UE autonomously configures a transmission resource, the UE can autonomously determine a power offset value of SA and a power offset value of data. Although a power offset value of a control signal and a power offset value of a data signal are transmitted in a manner of being explicitly included in the control signal, a value of transmit power applied to the control signal or the data signal can be transmitted in a manner of being directly included in the control signal. Specifically, transmit power of the control signal and transmit power of the data signal, the transmit power of the control signal, a power offset of the control signal, and a power offset of the data signal, or the transmit power of the data signal, the power offset of the data signal and the power of the control signal can be transmitted in a manner of being included in the control signal. For example, assume that power of A dBm is applied to the control signal and power of B dBm is applied to the data signal. In this case, values of the power can be transmitted in a manner of being explicitly included in the control signal. By doing so, an Rx UE is able to know sizes of power applied to the control signal and the data signal and a size of an offset (a power difference between the data signal and the control signal). The Rx UE can utilize the sizes of power and the size of the offset when the Rx UE measures signal strength and a pathloss. For example, when a UE measures an RS of a control signal and knows a size of transmit power of the control signal, the UE is able to calculate a pathloss of the control signal. The UE can calculate a pathloss of a data signal as well. The UE knows that there is a difference between transmit power of the control signal and transmit power of the data signal and a size of the difference. Hence, the UE is able to measure either the pathloss of the control signal or the pathloss of the data signal. The UE measures and utilizes a pathloss of each of the signals to more precisely measure pathloss.

Meanwhile, whether 1-DM is performed on SA and data can be differently configured according to speed of a UE, target coverages of the SA and the data, retransmission numbers of the SA and the data, BLER, MCS, a message size/type, an RB size, and the like. For example, in order for a UE to support relative speed of 500 km/h, it is necessary to expand target coverage to about 600m. In case of transmitting SA of 1 RB with 23 dBm to achieve the coverage, it may have reception SNR as much as 10 dB. In this case, if data of 9 RBs and SA are transmitted using the PDM scheme and PSD of the data and PSD of the SA are configured to be the same, SNR of the SA becomes 0 dB. In particular, referring to a BLER curve of single transmission shown in FIG. 13, it is able to see that about 30% of errors occur. Hence, in this case, it may be preferable to transmit the SA by performing TDM on the SA to secure coverage. When the SA is transmitted, in order to prevent from failing to receive data, it is necessary to support retransmission of the SA. A network can determine whether to perform TDM on the SA and the data according to a resource pool. Or, a UE can determine whether to perform TDM/FDM on the SA and the data according to moving speed of the UE, a message size, and a message type. Or, the network can signal an SA/data transmission technique, a power offset, and the like capable of being used according to a situation of a UE to the UE according to a situation. For example, when SA and data are TDMed, all or a part of a power value according to a channel, a power offset value between channels, and a ratio of power assigned to a control signal to the entire power can be signaled to the UE or can be determined in advance.

When D2D control information and D2D data are transmitted on a frequency axis in a manner of being adjacent to each other, the D2D control information can be transmitted via one of candidate resources predetermined on the frequency axis. In particular, as shown in FIG. 10, when SA and data are transmitted in a manner of being adjacent to each other, the SA can be transmitted on the frequency axis using an SA candidate resource. In this case, a position of the candidate resource can be configured in advance or can be configured by a network. Or, as described in the following, it may use a method of indicating frequency domain resource allocation information using a DMRS. When a position of a candidate resource is determined in advance, since control information includes size information of RA only, it is able to reduce signaling overhead.

In this case, an RB size capable of maximally transmitting data may vary depending on a transmission position of SA. In particular, a position of a candidate resource can determine a maximum value of a D2D data size. (A BW on which data is transmitted can be implicitly indicated according to a position of SA in a subframe in which the SA is transmitted.) Referring to FIG. 11, when SA uses a candidate resource 1101, data can be transmitted via wideband transmission. On the other hand, when the SA uses a candidate resource 1102, data can be transmitted via narrowband transmission only. For example, if SA is transmitted in a $40^{th}$ RB in a system of 50 RBs, data can be transmitted with maximum 10 RBs only. A scheme of mapping SA to a lower RB index of a transmission band is to set a limit on a size capable of transmitting data. Hence, in order to perform wideband transmission, SA can be deployed at the last RB of a transmission band. In this case, a UE receiving data firstly performs blind decoding on the SA. The UE indicates whether the data is deployed at the top of the SA or the bottom of the SA (whether the data is located at an RB index higher than a position of the SA or an RB index lower than the position of the SA) by configuring SA contents or a DMRS sequence/OCC/CS. For example, D2D control information can include information indicating either D2D control information or D2D data using a higher frequency band. For example, if the data is deployed at the bottom of the SA, DMRS CS 0 is used. If the data is deployed at the top of the SA, DMRS CS 6 is used. In addition, a position of an SA capable of being transmitted using a narrow band and a position of an SA capable of being transmitted using a wide band can be differently configured in advance.

Meanwhile, the SA can be deployed in a form of surrounding the data in frequency domain. In particular, D2D control information is transmitted via two separated resource regions and D2D data is contiguous with the two separated resource regions in the highest frequency band and the lowest frequency band, respectively. This example is illustrated in FIG. 12. According to the method above, since it is able to protect data from a signal of a different UE, it may have relatively less interference in in-band emission. In the aspect of less generating in-band emission, the data can be deployed in a form of surrounding the SA in frequency domain. In particular, control information is transmitted via a single resource region and data is transmitted in a form of surrounding a control signal. This method may have an additional effect of protecting a control signal from a different UE.

The D2D control information included in the two separated resource regions can include the same codeword. When the SA is deployed at the frequency domain, if the completely same codeword is deployed to be repeated in the frequency domain, it may be able to relatively reduce the increase of PARR. In this case, although it is able to transmit the SA in all subframes, as mentioned earlier in the proposed method, it may not transmit the SA in a partial subframe. In this case, rate matching or puncturing can be performed on a region where the SA is used to be transmitted. As mentioned in the following, a data position where the SA is not transmitted together can be indicated via a DMRS or a previously transmitted SA. As mentioned in the forgoing description, the method illustrated in FIG. 12 may use a candidate resource.

Meanwhile, D2D control information and D2D data can be transmitted using single DFT spreading. In this case, a method of indicating RA information using a DMRS sequence to be described in the following can be used at the same time. When a UE is equipped with multiple transmission antennas, although a separate DFT spreading is applied, if the control information and the data are transmitted via a different antenna, since multi cluster transmission is not necessary, PARR is not additionally increased. In this case, since the control information is more important, it may be able to determine a rule that the control information is transmitted from a first antenna port. This is because, when a UE is implemented, it is highly probable that a better amplifier is installed in the first antenna port. The present invention is not restricted by a specific antenna port. A port number is fixed in advance to generate a DMRS, utilize a better amplifier for transmitting and receiving an important signal, and perform decoding, by an Rx UE, under the assumption of a specific antenna port.

When SA and data are transmitted in a manner of being adjacent to each other, control information indicates not only control information on data of a corresponding subframe but also control information on the N number of subframes appearing after the subframe. For example, T-RPT information can be included in the control information. The control information may indicate positions at which the N numbers of subframes are transmitted. (T-RPT indicates a position of a time resource in which a data signal is transmitted. It is not mandatory to signal the T-RPT in a form of a bitmap. A position of a time resource in which a data resource is transmitted can be represented in an offset form at a position of a time resource in which SA is transmitted. In this case, all data signals can be represented in an offset form in a time resource in which SA is transmitted and a data signal can be sequentially represented in an offset form for a previous data (First data is an offset from a time resource in which SA is transmitted).) In this case, since an Rx UE is able to anticipate timing at which data is to be transmitted in a following subframe, a decoding success rate can be increased. On the other hand, since a different UE is able to anticipate a position at which data is to be transmitted in a following subframe, it may be able to avoid a corresponding resource.

In the scheme mentioned above, although it is able to always transmit data and SA in the same subframe, the SA can be transmitted in a partial subframe only. In this case, the data can perform rate matching or puncturing on a region at which the SA is transmitted. In particular, MCS can be determined by assuming a case that there is no SA. Or, it may be able to determine MCS of data by assuming a case that there is SA. If SA is not transmitted, it may be able to fill an RE in which the SA is transmitted by performing rate matching or additionally transmitting codeword bits. Or, a corresponding RB is emptied out to use the RB as a guard. Specifically, when control information and data occupy x, x+1, x+k RB, SA can be assigned to x, . . . , x+a and data can be assigned to x+a+1, . . . , x+k. In this case, in case of transmitting the data only, the data can be assigned to all of x, . . . , x+k RB or x+a+1, . . . , x+k only. The former case corresponds to a case of performing rate matching or puncturing by assuming that the data is assigned to x, . . . , x+k. The latter case corresponds to a case that the data is assigned to x+a+1, . . . , x+k.

A pool in which SA is transmitted can be distinguished from a pool in which data is transmitted in frequency domain. Control information indicated by the SA can indicate control information on data of a subframe in which the SA is transmitted or control information on the N number of upcoming subframes including the data of the subframe in which the SA is transmitted. (In this case, N may correspond to a predetermined value or a value signaled by a network.)

Figure 14:
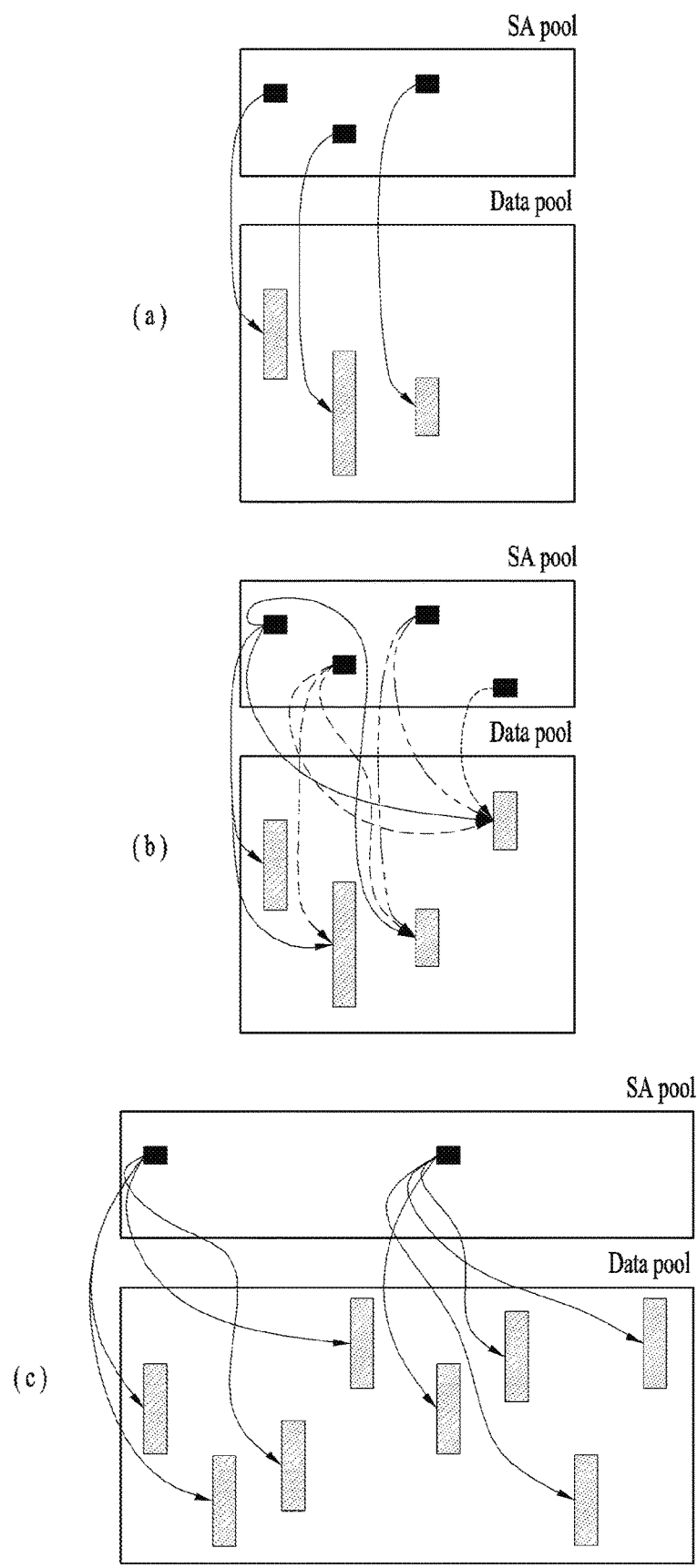

FIG. 14 illustrates various embodiments of the method above. FIG. 14 (a) illustrates a case that a pool of SA is distinguished from a pool of data in frequency domain and the SA and data related to the SA are transmitted in the same subframe. FIG. 14 (b) illustrates a case that the SA indicates not only a data of a subframe in which the SA is transmitted but also a data position of a following subframe. In this case, if information such as T-RPT is transmitted together, since a different UE is able to identify T-RPT of a corresponding UE, the different UE is able to select a resource by avoiding a corresponding resource at the time of selecting a resource from following time/frequency resources. FIG. 14 (c) illustrates a case that SA is transmitted in every new MAC PDU or every predetermined subframe interval instead of a case of transmitting SA in every data transmission.

Figure 15:
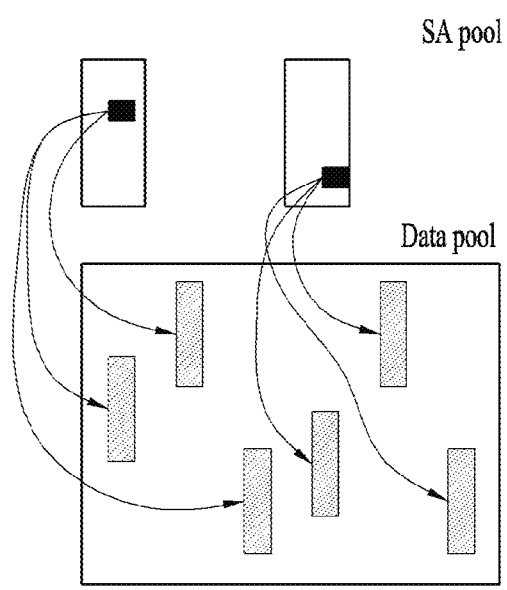

FIG. 15 illustrates a further different example. A difference between FIG. 15 and FIG. 14 (c) is to transmit SA in a partial time region only rather than the entire time region. As illustrated in FIG. 15, when an SA resource pool is distinguished from a data pool, it may measure either RSSI of the data pool or RSSI of the SA pool only. According to the method shown in FIG. 15, since control information is not transmitted in every subframe, it is able to increase efficiency of data transmission. According to the method, it may perform rate matching or puncturing on a data region in a subframe in which control information is transmitted in consideration of an RE transmitting the control information. According to the method, an Rx UE may attempt to decode the SA pool only. Hence, it is able to reduce battery consumption of the Rx UE compared to a scheme of attempting to perform decoding in every subframe.

Meanwhile, as shown in FIGS. 14 and 15, a case of transmitting control information of various data transmissions in one SA is explained in detail. One SA can transmit control information of various data transmissions. If the data transmissions relate to TBs (transport blocks) different from each other, it may have a different RB size, a different MCS, and the like. In this case, since an amount of control information to be indicated by the SA is large, contents of the SA become large. As a result, efficiency of a resource can be degraded. In order to solve the problem, when the control information of various data transmissions is transmitted by the SA, it may be able to configure data to be transmitted from a single TB. In particular, since retransmission is performed on the same TB, it is not necessary to transmit any additional RB size, MCS, and the like. By doing so, it is able to more efficiently transmit the SA.

Figure 16:
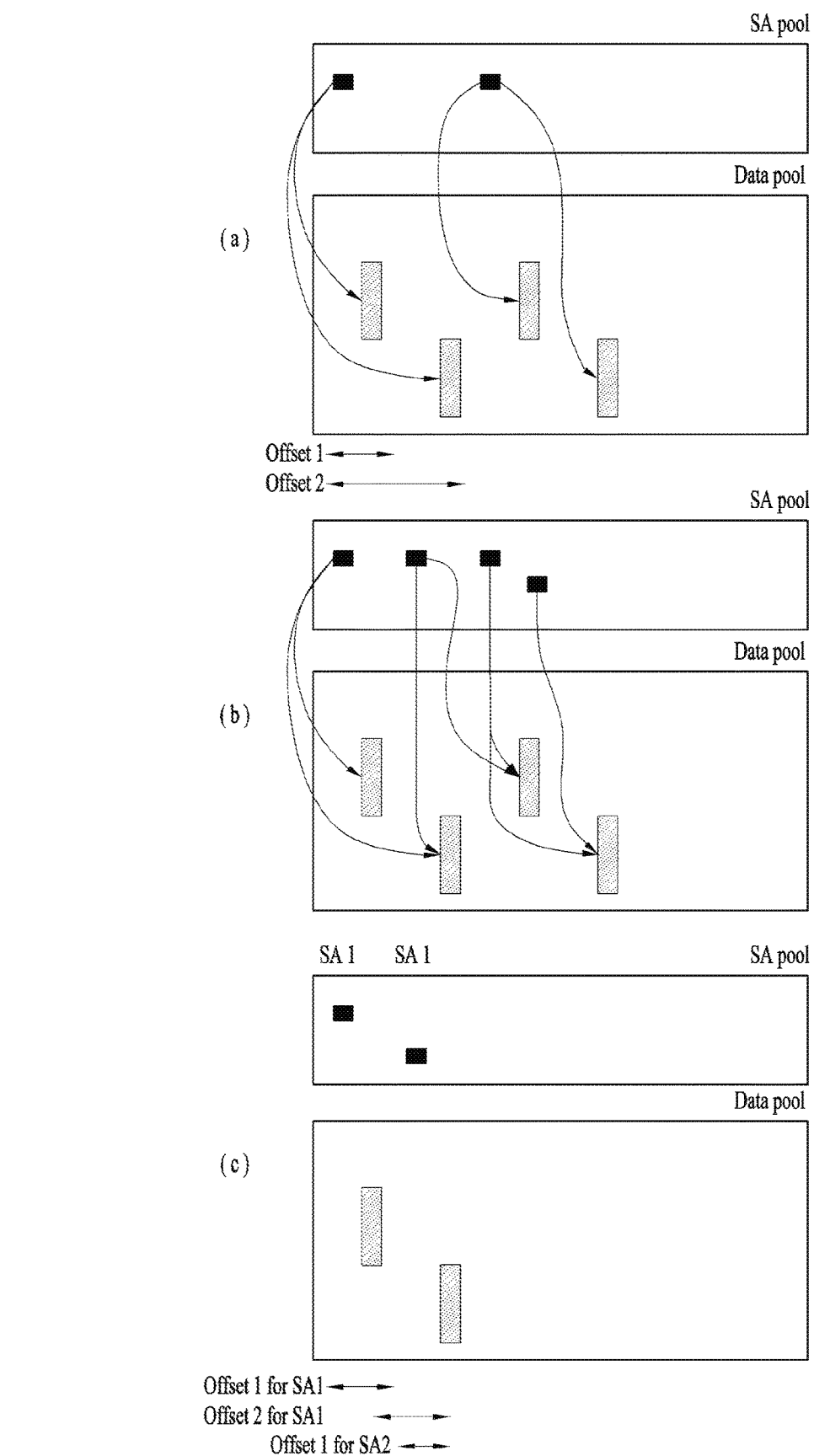

And, it may be able to set a limit on the maximum number of data scheduled by the SA. The limit can be determined in advance or can be configured by a network. For example, it may be able to determine a rule that one SA schedules data transmission maximum two times. In this case, it is necessary for the SA to indicate positions of time-frequency resources for the two data transmissions. In this case, if it is assumed that a size of a frequency resource, MCS, and the like are related to the same TB, the two transmissions can be sufficiently indicated by one indication. A position of a time resource can be represented in an offset form or a T-RPT form at a position at which the SA is transmitted. If the position of the time resource is represented in the offset form, offset 1 and offset 2 can be transmitted in a manner of being included in the SA. (If there are N number of date, N number of offsets can be included in the SA.) Or, the position of the time resource can be represented by an offset of data 1 or an offset between data 1 and data 2 in the SA. When the SA is transmitted several times, one SA may schedule the same number of data all the time and another specific SA may schedule a different number of data. For example, as shown in FIG. 16 (a), one SA may schedule 2 data all the time. Or, like the last SA transmission shown in FIG. 16 (b), specific SA may schedule one data only. In this case, it may indicate that scheduling is not performed using a specific state among offsets included in the SA. For example, if an offset is represented using two bits and two offsets are included in the SA, a specific bit state (00 or 11) of the second offset can be configured by a field indicating that there is no data. As a different method, a field indicating the number of scheduled data can be explicitly included in the SA. In this case, an offset can be fixed by a specific value in advance according to a corresponding field configuration or it may be able to determine a rule that an Rx UE does not use the offset (the Rx UE does not decode data at a position of the offset).

When a plurality of SAs schedule a specific data, if information indicated by a following SA is different from information indicated by a preceding SA, it is necessary to define an operation of an Rx UE. For example, if the SAs indicate a different RA, MCS, and the like, it may be able to determine a rule that decoding is performed on the basis of the following (or preceding) SA. Or, if the preceding SA and the following SA transmit different information at the same data position, it can be regarded as an error case. In particular, the Rx UE may not perform data decoding or may perform a different operation. Meanwhile, when SA is transmitted several times, an offset between the first SA and the first data can be configured to be identical to a space between the second SA and the second data. FIG. 16 (c) shows an embodiment for the method above. An offset 1 for SA 1 and an offset 1 for SA 2 can be configured by the same value. In this case, a value of the offset 1 may not be signaled by the SA. The value may correspond to a value determined in advance in a pool or a value signaled by a network. In this case, the SA signals a value of the offset 2 only. By doing so, it may be able to more efficiently configure fields of the SA.

The aforementioned methods can be classified into a case of transmitting SA and data in the same subframe and a case of transmitting SA and data in a different subframe. In this case, a field indicating whether data associated with the SA is transmitted in the same subframe, the field indicating whether the data is transmitted in a next SA period, and the field indicating a subframe in which the data is transmitted after SA is transmitted can be transmitted in a manner of being included in the SA. The SA can indicate a transmission start point of the data. In this case, the transmission start point may indicate a position at which the data is transmitted or the timing at which a T-RPT bitmap starts.

When SA and data are transmitted in the same subframe, FIG. 17 is a diagram illustrating a method of indicating a position of a frequency domain resource of the data using an offset. In this case, a time offset can be determined in advance between SA and a data resource region or can be indicated by a network via physical layer signaling or higher layer signaling. In particular, if an offset is indicated between resource regions, as shown in FIG. 17 (b), while a position of a data transmitted in a different subframe is indicated, a frequency resource region of the data is indicated by a frequency resource region position of the SA. Meanwhile, although the offset between the SA resource and the data resource may correspond to a common value to a UE, the offset can be assigned to a specific UE only according to a priority of the UE or a message size. For example, when wideband data transmission is performed to transmit such a message as an event triggered message, if SA and data are transmitted in the same subframe, since coverage of the SA is not sufficient, a problem may occur in receiving the data. Hence, it may provide an offset between the SA and the data to separately transmit the SA and the data in a time domain. If a time domain offset is provided to a specific UE only, a field indicating whether the time domain offset is applied (between SA and data transmission) and/or a field indicating a size of the time domain offset can be transmitted in a manner of being included in the SA. Or, the information can be indicated to an Rx UE by differently configuring a DMRS of the SA. According to the proposed method, since a resource position of data is indicated using a time/frequency resource position of the SA, it may be able to reduce the number of resource allocation information bits of data.

Meanwhile, when an offset between SA and data is determined in advance or is determined by a network, an offset between the first SA and data should have a form such that an offset between the second SA and data is fixed. In particular, a value of the first offset in the second SA can be always configured to be identical to an offset value of the first SA. When a data resource is preferentially selected and an SA resource is selected after the data resource is selected, it may be able to determine a rule that resource positions of a plurality of SAs are configured to be identical to an offset between the first SA resource and a data resource when a plurality of data resources are selected. In particular, when a position of a data resource is selected and then a position of an SA resource is selected, a UE can easily implement the position of the SA resource which is transmitted several times. And, when a position of an SA resource is configured by the same offset, as an extreme example, it is not necessary to separately signal an offset value between SA and data.

Meanwhile, when SA and data are transmitted in the same subframe, it may use following methods to perform retransmission.

First of all, when SA is transmitted by selecting a specific SA resource within an SA period according to a predetermined hopping pattern and data is transmitted in a subframe in which the SA is transmitted, if a resource position (logical index) of the data, MCS, and the like are identically configured at the time of retransmission, the SA can obtain a HARQ combining gain. Since the data is retransmitted at a position identical to a frequency position indicated by the first SA, the data can also obtain a HARQ combining gain. Currently, the SA allows two transmissions within the SA period. If retransmission of the SA is increased to 3 or 4 times, a hopping pattern for the retransmission can be determined in advance and the data can be transmitted in the subframe in which the SA is transmitted.

Secondly, a subframe index at which a next retransmission is to be performed or an offset can be transmitted in a manner of being included in every SA. In this case, not only a subframe in which a next retransmission is performed but also subframes in which N number of retransmissions are performed can be transmitted in a manner of being included in SA. According to the present method, since contents of SA vary in every SA transmission, HARQ combining of SA is not mandatory. However, since data is retransmitted, HARQ combining of data is permitted.

Meanwhile, information such as frequency domain RA (resource allocation), MCS, NDI, and the like can be indicated using an RS sequence of a DMRS. Specifically, in order to indicate frequency domain RA information, it may differently configure a DMRS sequence according to RA. To this end, a candidate of a start point can be determined in advance according to an RA size and a different DMRS sequence can be configured according to the RA size. An Rx UE performs blind decoding on the candidate and the DMRS sequence to identify RA. This method is not restricted to the RA. In particular, it may be able to differently configure an RS sequence according to MCS or NDI. Specifically, the number of RS blind detection counts is restricted according to an RA size and an Rx UE can perform blind detection on a DMRS from a start point predetermined according to an RA size. After the blind detection is performed according to RA, the Rx UE performs data decoding on a DMRS sequence having the highest correlation value.

Figure 18:
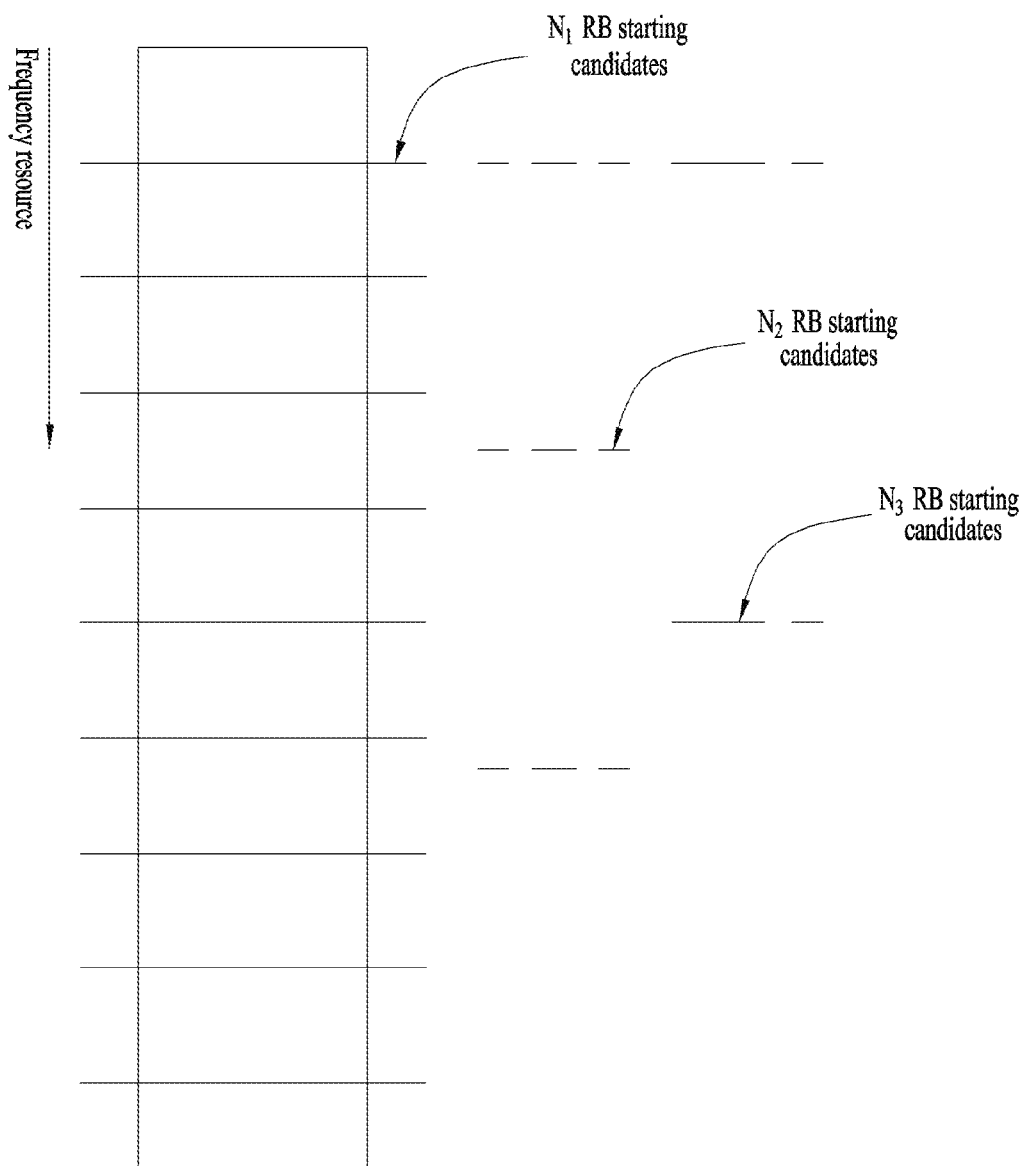

FIG. 18 illustrates a blind decoding candidate position for an RA start point in frequency domain. A start point of a predetermined position can be determined in advance according to an RB size or can be configured by a network. In this case, control information rather than RA can be transmitted in a subframe in which data is transmitted using a UCI piggyback scheme or a scheme of transmitting the control information by including the control information in a higher layer signal. In this case, RA information can also be included in the control information to check whether RA is correctly detected. Or, the RA information may not be included in the control information. This is because, if it fails to detect RA, since it also fails to decode data, CRC checking fails. If RA is included in the control information, it may implicitly indicate that a CRC length is extended.

Method of Distinguishing SA Transmission from D2D Data Transmission on Time Axis It may be able to transmit all or a part of control information on following subframes (including a subframe in which D2D control information is transmitted) in every $N^{th}$ D2D subframe within a D2D resource pool period. For example, referring to FIG. 19 (a), it may be able to transmit a packet including information indicating T-RPT in every $N^{th}$ subframe. In this case, the N can be configured in advance or can be configured by a network. Referring to FIG. 19 (a), T-RPT indicates positions at which N−1 number of subframes are transmitted. As a different form, T-RPT may indicate positions at which the N subframes are transmitted and a position of the last 1 of the T-RPT can determine that next control information (T-RPT) is transmitted.

As illustrated in FIG. 19 (b), T-RPT can be transmitted in a plurality of subframes in every $N^{th}$ subframe to solve a half-duplex problem or obtain energy gain. In particular, it may be able to configure D2D control information to be transmitted in the first N1 number of 1s in the T-RPT. In this case, the N1 may correspond to a value determined in advance or the value configured by a network. A plurality of the subframes can be continuously transmitted in time domain or can be transmitted in subframes apart from each other in timely manner. In this case, a packet, which is transmitted to transmit D2D control information, may have a separate format (e.g., a format for separately transmitting D2D control information, e.g., PSCCH or PSCCH of a new form). Or, similar to UCI piggyback scheme, T-RPT information can be transmitted in a manner of being included in a partial RE. In this case, as shown in FIG. 20 (a), the UCI piggyback scheme may correspond to a method of using a part of REs near a DMRS to transmit HARQ ACK or RI. Or, as shown in FIG. 20 (b), the UCI piggyback scheme may correspond to a method of using a part of REs from a lower subcarrier of a lowest RB using time first mapping to transmit a control signal. In D2D, it may be able to indicate all or a part of D2D data control information using one of the two methods (a method of using REs in a lowest RB similar to the CQI piggyback scheme and a method of using REs near a DMRS similar to PMI/RI/ACK).

In a subframe in which T-RPT is transmitted, not only the T-RPT but also information indicating MCS of a packet to be transmitted in a following subframe, a redundancy version (RV), transmit power, transmission count per MAC PDU, RV cycling type (information indicating whether RV is transmitted in a manner of being fixed or in a manner of varying), and the like can be transmitted. Information indicating the T-RPT may indicate a transmission position in a following N-1 subframe in a bitmap form.

When all UEs transmit SA in the same subframe, if a UE transmits control information in the same subframe, since the UE is unable to listen to a control signal of a different UE due to a half-duplex constraint, the UE is unable to receive a data. Hence, in FIG. 19 (a), it is preferable to apply a hopping scheme to control information which is transmitted to the N1 number of subframes to solve the half-duplex constraint that changes a subframe position according to a period of the N number of subframes. Or, as shown in FIG. 21 (a), it may consider a method of differently applying an offset of a subframe in which control information is transmitted according to a UE. In this case, an offset of a subframe in which control information is transmitted can be differently configured in every N subframes. For example, it may be able to configure a different offset according to a UE due to a Tx UE ID, an Rx UE ID, a UE group ID, or a parameter configured by a network. The offset may vary with a period (a predetermined period or a period of transmitting a message determined by a UE) of the N number of subframes. As shown in FIG. 21 (b), if a different offset hopping pattern is applied to each UE, it may be able to prevent SA from being transmitted in the same subframe.

Meanwhile, a subframe period for transmitting control information can be configured in a unit of a MAC PDU. In other word, D2D control information can be newly transmitted whenever a new MAC PDU is transmitted. The D2D control information can indicate a subframe position (T-RPT) where D2D data is transmitted in a following subframe, MCS, and the like.

When partial control information is transmitted via SA and a transmission parameter is changed within an SA period, it may transmit control information in the middle of transmitting data. Specifically, when an SA resource pool is defined and basic control information is transmitted in a corresponding region, if a packet transmission parameter is changed, the control information can be transmitted together with a packet. Or, the control information can be transmitted in a subframe prior to a subframe in which the packet is transmitted. For example, it may change RV, transmit power, and MCS. The control information can be transmitted in a manner of being included in the aforementioned UCI piggyback scheme or an MAC header region. A position of a resource, which is transmitted within an SA period, may change. In this case, it may be able to transmit T-RPT for the T number of upcoming subframes. The T-RPT can be transmitted in a manner of being included in a UCI piggyback scheme, a MAC header, or a MAC control signal.

Meanwhile, D2D control information can indicate contents for the X number of upcoming subframes (sliding window scheme). According to the present method, D2D control information and data can be transmitted together in every subframe. In this case, when an Rx UE starts to receive a certain subframe, since the X number of control information are transmitted together, the Rx UE is able to perform decoding. Although a Tx UE changes a transmission parameter, the Rx UE can immediately apply the transmission parameter.

Figure 22:
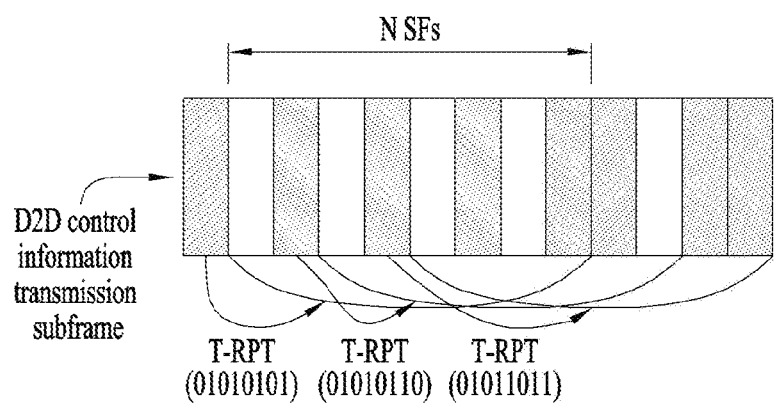

Specifically, the control information can be transmitted together with a data region by applying separate channel coding to the control information. Or, the control information can be transmitted together with data via higher layer signaling. For example, the control information can be transmitted to a MAC header or a MAC control region. Or, the control information can be transmitted to a separate RB or a group of REs in a form such as separate channel coding or a separate channel structure (PUSCH or PUCCH). In this case, similar to multi cluster transmission, it may assume that separate DFT spreading is applied to the control information and the data. FIG. 22 illustrates an example of the sliding window scheme. Referring to FIG. 22, it is able to see that T-RPT varies in every N number of subframes. In this case, it may also be able to differently configure MCS, RV, and the like. The control information can include not only control information on the X number of upcoming subframes but also control information on data of a subframe in which the control information is transmitted. In particular, the control information can indicate the X number of upcoming subframes as well as the data of the subframe in which the control information is transmitted.

FIG. 23 illustrates a scheme that TDM is performed on a resource pool of SA and a resource pool of data in a subframe. In this case, a frequency domain start point of the SA may indicate a frequency domain start point of the data or a start point of the data can be implicitly indicated by a position of the SA. According to the present scheme, when UEs select a different data position in the same subframe, it is able to prevent SAs from being collided. Or, SA can be transmitted at a predetermined position among frequency positions at which data is transmitted. For example, the SA can be transmitted at positions rather than a number of RBs located at both ends among the positions at which the data is transmitted. This is intended to reduce interference due to in-band emission between SAs. The present method can also be applied to a case that SA and data are transmitted in the same subframe in a manner of being FDMed.

Or, SA may indicate the entire RA information of data. According to the present scheme, a frequency domain in which the SA is transmitted may not be overlapped with a frequency domain in which the data are transmitted. It may be able to transmit not only control information on a subframe in which the SA is transmitted but also control information on the data for a following subframe in the SA. In this case, it may be able to transmit the data only in the following subframe without the SA. Or, D2D control information on the X number of subframes can be indicated in every subframe. FIG. 23 (b) illustrates an embodiment for the case above. FIG. 23 (c) illustrates a case that data is transmitted to an SA transmission region in a subframe in which D2D control information is not transmitted. In particular, a Tx UE can perform encoding under the assumption that SA is not transmitted. In a subframe in which SA is transmitted, rate matching or puncturing can be performed on an RE of a symbol in which the SA is transmitted. Yet, in a subframe in which the SA is not transmitted, rate matching or puncturing can be always performed on a region in which the SA is transmitted to protect SA transmission of a different UE.

A position at which SA is transmitted may correspond to a symbol(s) near a DMRS rather than a first symbol of a subframe. In order to enhance decoding performance of SA, it may transmit an additional RS. A position of the additional RS can be transmitted to a different symbol other than a legacy DMRS and the position can be determined in advance. If SA and data are transmitted in the same subframe, transmit power can be consistently maintained. In this case, an RB size of the SA may correspond to a predetermined size. If the RB size of the SA is different from an RB size of the data in frequency domain, PSD (power spectral density) of the SA may differ from PSD of the data.

Other Methods

Figure 24:
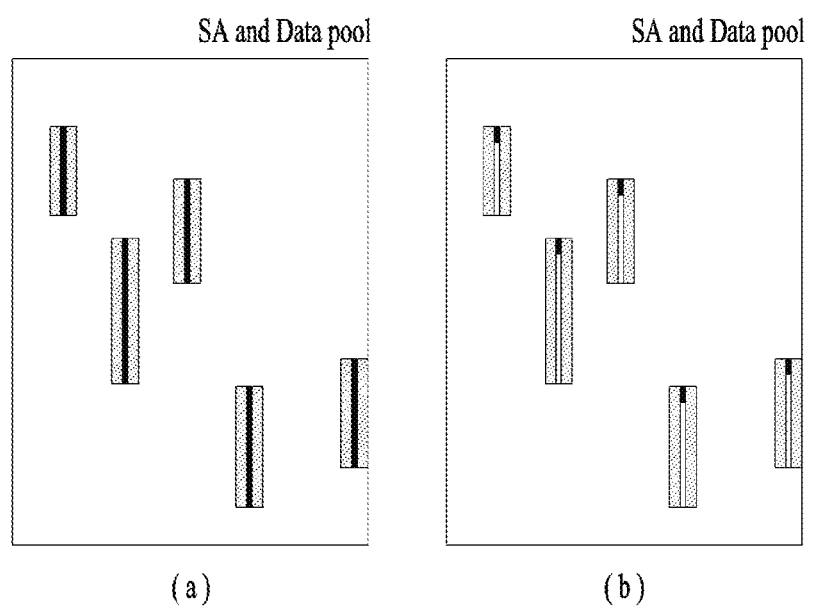
FIG. 24 is a diagram illustrating other methods.

As a different example of transmitting D2D control information, control information and data can be transmitted in a manner of being distinguished from each other in time domain. FIG. 24 (a) illustrates an embodiment of the method. According to the method shown in FIG. 24, data is distinguished from control information in time domain and decoding is performed on the data after the control information is decoded. Similar to multi cluster transmission, the method has a merit in that there is no PAPR increase. Since the control information is more important in performing decoding, the control information can be transmitted at a predetermined symbol near a DMRS. However, since a region at which the control information is transmitted varies according to an RA size, it may have a demerit in that data efficiency is degraded. In order to supplement the demerit, it may fix a size of frequency domain in which the control information is transmitted and data can be transmitted in a manner of being mapped to the remaining REs. FIG. 24 (b) illustrates an embodiment for the method above. When SA and data are TDMed in a subframe, the SA and the data may have different transmit power. In this case, a power transient period can be assigned to a data region.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Method of Receiving PSCCH and PSSCH Indicated by PSCCH

In the following, a method of receiving a PSCCH and a PSSCH indicated by (corresponding to) the PSCCH is explained according to one embodiment of the present invention. In this case, the PSCCH corresponds to control information previously referred to as the SA and the PSSCH corresponds to PSSCH. In particular, following description relates to a case that the PSCCH and the PSSCH are transmitted in a manner of being FDMed (Frequency Division Multiplexed) (e.g., V2X, etc.).

According to one embodiment of the present invention, a UE can receive a PSCCH including information indicating a time interval between the PSCCH and a PSSCH indicated by the PSCCH and information indicating whether the PSSCH is retransmitted (a field indicating whether the PSCCH is a first transmission or a retransmission). This information may correspond to control information defined by an SCI format. Having received the control information, a UE can receive the PSSCH in a resource which is determined using the information indicating the time interval and the information indicating whether the PSSCH corresponds to a retransmission. In this case, when the resource is determined, the information indicating the time interval can be used as a positive value or a negative value depending on whether the PSSCH corresponds to the retransmission. Specifically, when the PSSCH corresponds to the retransmission, a resource is located at a subframe prior to a subframe in which the PSCCH is received as much as the information indicating the time interval. In particular, when the PSSCH corresponds to the retransmission, the information indicating the time interval is used a negative value. If the PSSCH corresponds to a first transmission of retransmission, a resource is located at a subframe appearing after a subframe in which the PSCCH is received as much as the information indicating the time interval. In particular, when the PSSCH corresponds to a first transmission rather than a retransmission, the information indicating the time interval is used as a positive value. In other word, a field indicating information on whether a PSCCH corresponds to a first transmission or a retransmission can be transmitted in a manner of being included in the PSCCH. When the field indicates/means the first transmission, an offset indicates a following PSSCH transmission on the basis of a subframe in which the PSCCH is transmitted. When the field indicates/means the retransmission, the offset may indicate a PSSCH transmitted in a previous subframe.

According to the abovementioned configuration, although a UE misses a PSCCH (corresponding to a first transmission), the UE is able to identify both a firstly transmitted PSSCH and a retransmitted PSSCH. In particular, it is able to reliably forward a PSCCH without using MCS of a higher level or relatively higher transmit power.

It is able to use measurement described in the following based on the aforementioned description or irrespective of the description.

When a PSCCH and a PSSCH are FDMed and the PSSCH corresponds to a retransmission, a UE can estimate a measurement result for the PSSCH using a measurement result of a first transmission of a retransmission. In this case, the measurement result may correspond to transmit power of a reference signal for the PSSCH. Or, the reference signal may correspond to a DMRS (DeModulation Reference Signal) of the PSCCH. In particular, when a PSCCH is transmitted two times, if a UE fails to receive the firstly transmitted PSCCH and succeeds in receiving the secondly transmitted PSCCH (or, if the UE fails to receive the firstly transmitted PSCCH, a resource reselection is triggered, and a transmission is performed immediately after the resource reselection is triggered, the UE should use a measurement result as it is), the UE measures RS power or energy of a resource of data indicated by the secondly transmitted PSCCH to estimate RS power or energy of the firstly transmitted PSSCH.

According to the configuration above, if the UE succeeds in performing decoding on at least one of the two PSCCH transmissions, the UE can estimate power of transmission of another PSSCH using reception power of a PSSCH indicated by one PSCCH. If the UE succeeds in performing decoding on the two PSCCH transmissions, RS reception power or energy can be separately measured in each of PSSCH resources.

Figure 26:
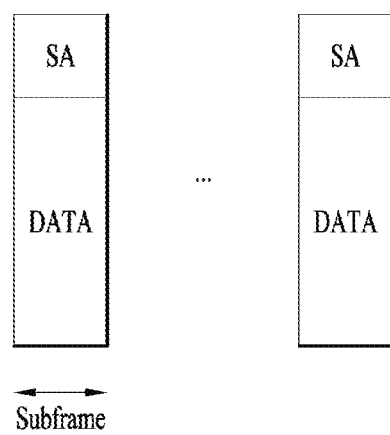

As illustrated in FIG. 25 (a) to (c) and FIG. 26, the aforementioned description can be applied to a case that a PSCCH schedules maximum two data.

The aforementioned descriptions can be applied not only to D2D communication but also to uplink or downlink. In this case, a base station, a relay node, and the like can use the proposed method.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal). Or, it may be able to define a rule that a Tx UE signals the information to an Rx UE or the Rx UE requests the information to the Tx UE.

Configurations of Devices for Embodiments of the Present Invention

Figure 27:
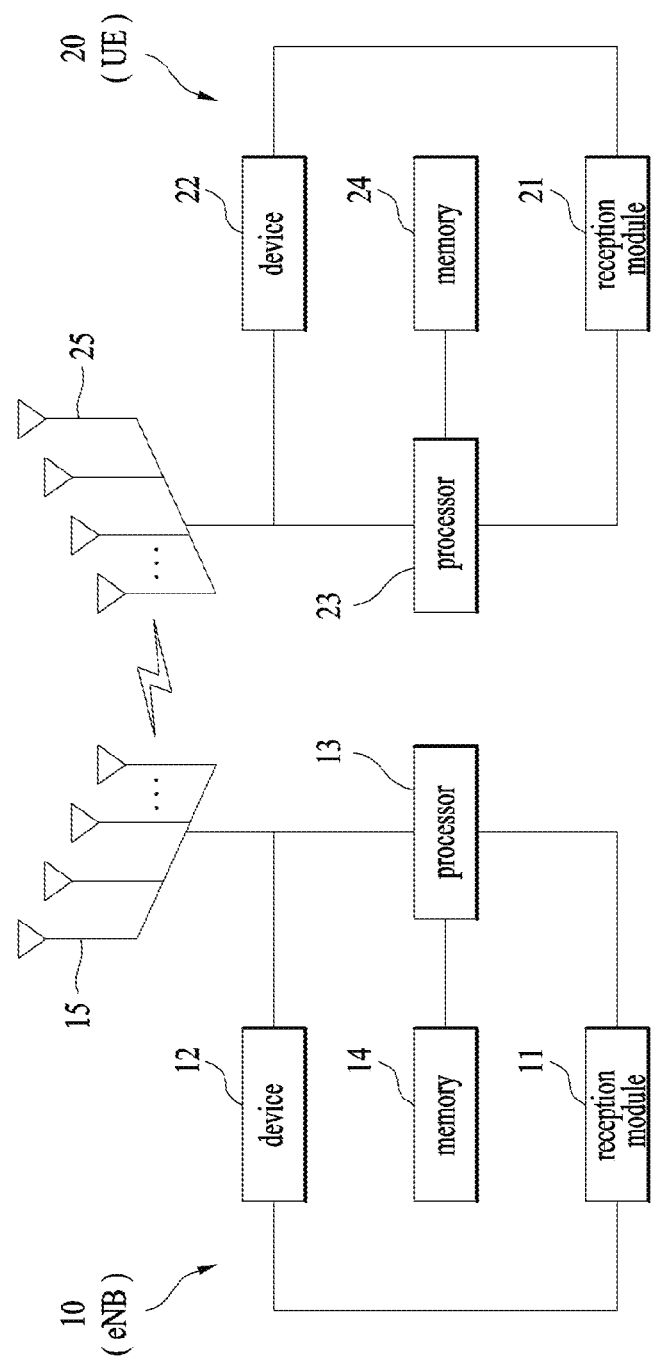
FIG. 27 is a diagram illustrating configurations of a transmission apparatus and a reception apparatus.

FIG. 27 is a diagram for configurations of a transmit point apparatus and a UE.

Referring to FIG. 27, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10. The processor 13 of the transmit point apparatus 10 according to one embodiment of the present invention may perform processes necessary for the embodiments described above.

Besides, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 27, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

In addition, the processor 23 of the UE device 20 may perform a function of processing information received by the UE device 20, information to be transmitted by the UE device 20, and the like. The memory 24 may store the processed information during a prescribed time period and be substituted with a component such as a buffer (not shown in the drawing) or the like.

The configurations of the transmission point device and the UE device may be implemented such that the above-described embodiments can be independently applied or two or more thereof can be simultaneously applied, and redundant description is omitted for clarity The description of the transmission point device 10 in FIG. 27 may be equally applied to a relay as a downlink transmission entity or an uplink reception entity, and the description of the UE device 20 in FIG. 27 may be equally applied to a relay as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of receiving a PSCCH (Physical sidelink control channel) and a PSSCH (Physical sidelink shared channel), which are received by a user equipment (UE) in a wireless communication system, comprising the steps of:
receiving, by the UE, a PSCCH including a first information indicating a time interval between an initial transmission and a retransmission of a PSSCH and a second information indicating whether the PSSCH corresponds to the initial transmission or the retransmission; and identifying, by the UE, at least one resource among two resources for the initial transmission and the retransmission based on the first information and the second information, wherein the first information is used as a positive value for identifying a retransmission resource from a resource of the PSCCH based on that the second information indicates the initial transmission, and wherein the first information is used as a negative value for identifying an initial transmission resource from a resource of the PSCCH based on that the second information indicates the retransmission.

2. The method of claim 1, wherein when the PSSCH corresponds to the retransmission, the initial transmission resource is included in a subframe n-k, wherein the PSCCH is in subframe n and the k is the time interval.

3. The method of claim 1, wherein when the PSSCH corresponds to the initial transmission, the retransmission resource is included in a subframe n+k, wherein the resource of the PSCCH is in subframe n and the k is the time interval.

4. The method of claim 1, wherein when the PSCCH and the PSSCH are FDMed (Frequency Division Multiplexed) and the PSSCH corresponds to the retransmission, the UE estimates a measurement result for the PSSCH using a measurement result of a first transmission of the retransmission.

5. The method of claim 1, wherein the measurement result corresponds to transmit power of a reference signal for the PSSCH.

6. The method of claim 5, wherein the reference signal corresponds to a DMRS (DeModulation Reference Signal) of the PSCCH.

7. A user equipment (UE) receiving a PSCCH (Physical sidelink control channel) and a PSSCH (Physical sidelink shared channel) in a wireless communication system, comprising:

a transmitter and receiver; and a processor, the processor configured to receive a PSCCH including a first information indicating a time interval between an initial transmission and a retransmission of a PSSCH and a second information indicating whether the PSSCH corresponds to the initial transmission or the retransmission, the processor configured to identify at least one resource among two resources for the initial transmission and the retransmission, wherein the first information is used as a positive value for identifying a retransmission resource from a resource of the PSCCH based on that the second information indicates the initial transmission, and wherein the first information is used as a negative value for identifying an initial transmission resource from a resource of the PSCCH based on that the second information indicates the retransmission.

8. The UE of claim 7, wherein when the PSSCH corresponds to the retransmission, the initial transmission resource is included in a subframe n-k, wherein the resource of the PSCCH is in subframe n and the k is the time interval.

9. The UE of claim 7, wherein when the PSSCH corresponds to the initial transmission, the retransmission resource is included in a subframe n+k, wherein the resource of the PSCCH is in subframe n and the k is the time interval.

10. The UE of claim 7, wherein when the PSCCH and the PSSCH are FDMed (Frequency Division Multiplexed) and the PSSCH corresponds to the retransmission, the UE estimates a measurement result for the PSSCH using a measurement result of a first transmission of the retransmission.

11. The UE of claim 7, wherein the measurement result corresponds to transmit power of a reference signal for the PSSCH.

12. The UE of claim 11, wherein the reference signal corresponds to a DMRS (DeModulation Reference Signal) of the PSCCH.

* * * * *